(12) United States Patent
Minemura

(10) Patent No.: US 10,244,201 B2
(45) Date of Patent: Mar. 26, 2019

(54) ELECTRONIC APPARATUS AND COMMUNICATION CONTROL METHOD

(71) Applicant: Kabushiki Kaisha Toshiba, Tokyo (JP)

(72) Inventor: Takashi Minemura, Ome (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/257,676

(22) Filed: Apr. 21, 2014

(65) Prior Publication Data
US 2015/0104144 A1 Apr. 16, 2015

(30) Foreign Application Priority Data
Oct. 15, 2013 (JP) .................... 2013-214737

(51) Int. Cl.
*H04N 5/92* (2006.01)
*H04N 5/93* (2006.01)
(Continued)

(52) U.S. Cl.
CPC ......... *H04N 5/9201* (2013.01); *G11B 27/105* (2013.01); *G11B 27/28* (2013.01); *H04L 65/1069* (2013.01); *H04L 65/80* (2013.01); *H04L 69/28* (2013.01); *H04N 5/775* (2013.01); *H04N 5/93* (2013.01); *H04N 21/4122* (2013.01); *H04N 21/41407* (2013.01); *H04N 21/4312* (2013.01); *H04N 21/43637* (2013.01); *H04N 21/440236* (2013.01); *H04N 21/8545* (2013.01); *H04N 21/8547* (2013.01); *H04W 4/18* (2013.01)

(58) Field of Classification Search
None
See application file for complete search history.

(56) References Cited

U.S. PATENT DOCUMENTS 5,457,495 A * 10/1995 Hartung ................. G06T 9/008
                                                                348/14.01
7,139,467 B2    11/2006 Seo et al.
(Continued)

FOREIGN PATENT DOCUMENTS

| JP | 2004-064787 | 2/2004 |
|----|-------------|--------|
| JP | 2010-035206 | 2/2010 |

(Continued)

OTHER PUBLICATIONS

European Application No./Patent No. 14163896.5; Extended European Search Report; dated Nov. 6, 2014.

*Primary Examiner* — Heather R Jones
(74) *Attorney, Agent, or Firm* — Rutan & Tucker, LLP

(57) ABSTRACT

According to one embodiment, an electronic apparatus includes a decoder, a transmitter and an operation processor. The decoder decodes a control stream in encoded content data including an AV stream and the control stream for controlling the AV stream. The transmitter transmits the AV stream and the control stream to an external apparatus, wherein first time information is added to the AV stream and second time information is added the control stream. The operation processor executes, in response to a user operation in the external apparatus, a process corresponding to the operation by using the decoded control stream while video is being displayed on a screen of the external apparatus.

20 Claims, 24 Drawing Sheets

(51) Int. Cl.
*H04N 5/775* (2006.01)
*G11B 27/10* (2006.01)
*G11B 27/28* (2006.01)
*H04L 29/06* (2006.01)
*H04N 21/4363* (2011.01)
*H04N 21/41* (2011.01)
*H04N 21/414* (2011.01)
*H04N 21/431* (2011.01)
*H04N 21/4402* (2011.01)
*H04N 21/8545* (2011.01)
*H04N 21/8547* (2011.01)
*H04W 4/18* (2009.01)

(56) References Cited

U.S. PATENT DOCUMENTS

| | | |
|---|---|---|
| 2004/0264929 A1 | 12/2004 | Lee et al. |
| 2005/0213439 A1 | 9/2005 | Johnson |
| 2009/0240848 A1 | 9/2009 | Huetter et al. |
| 2012/0311187 A1 | 12/2012 | Lv |
| 2013/0009887 A1* | 1/2013 | Huang et al. ............. 345/173 |
| 2013/0223539 A1* | 8/2013 | Lee et al. ............. 375/240.25 |

FOREIGN PATENT DOCUMENTS

| | | |
|---|---|---|
| JP | 2013-520884 | 6/2013 |
| WO | 2015056296 A1 | 4/2015 |

\* cited by examiner

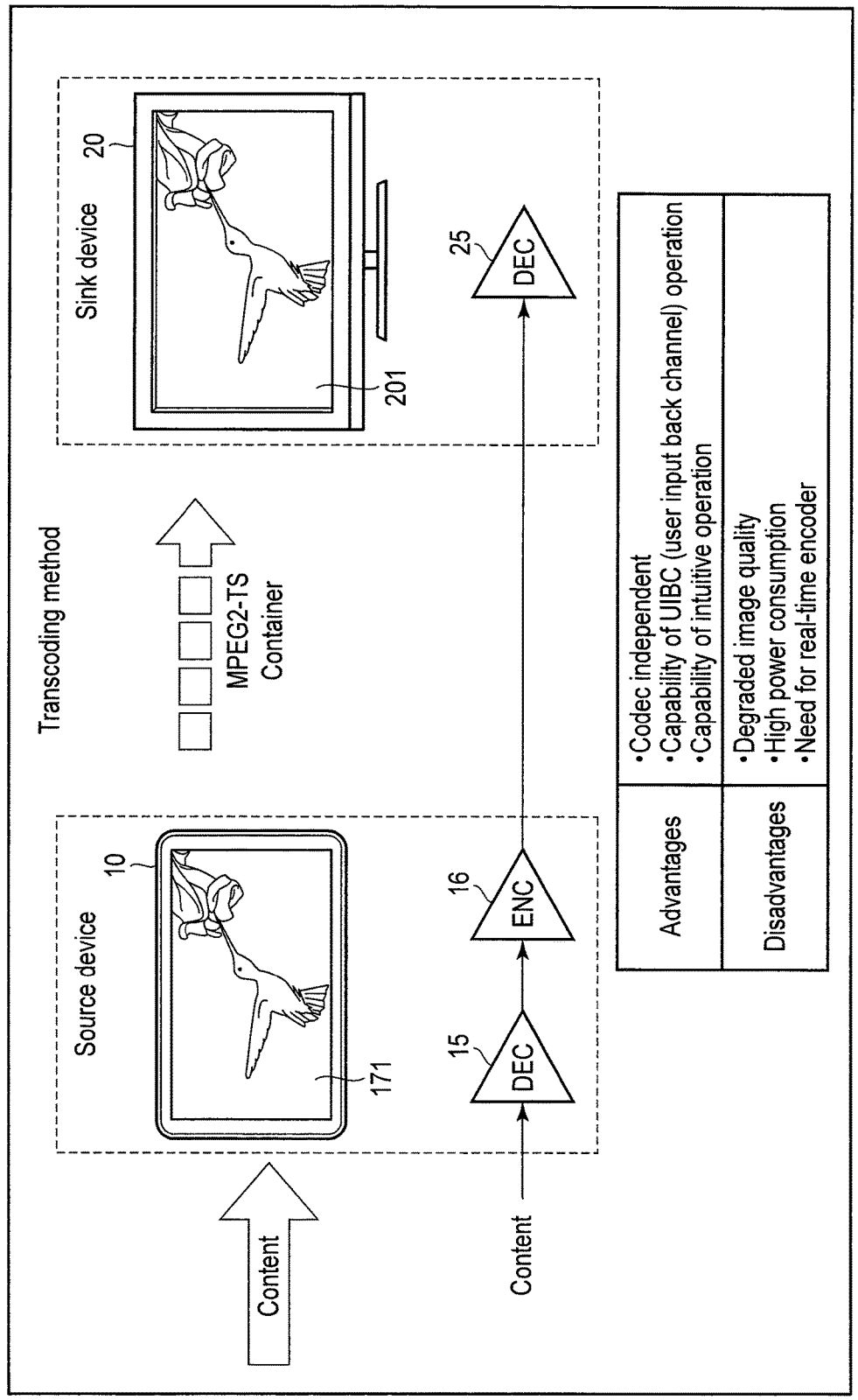
F I G. 3

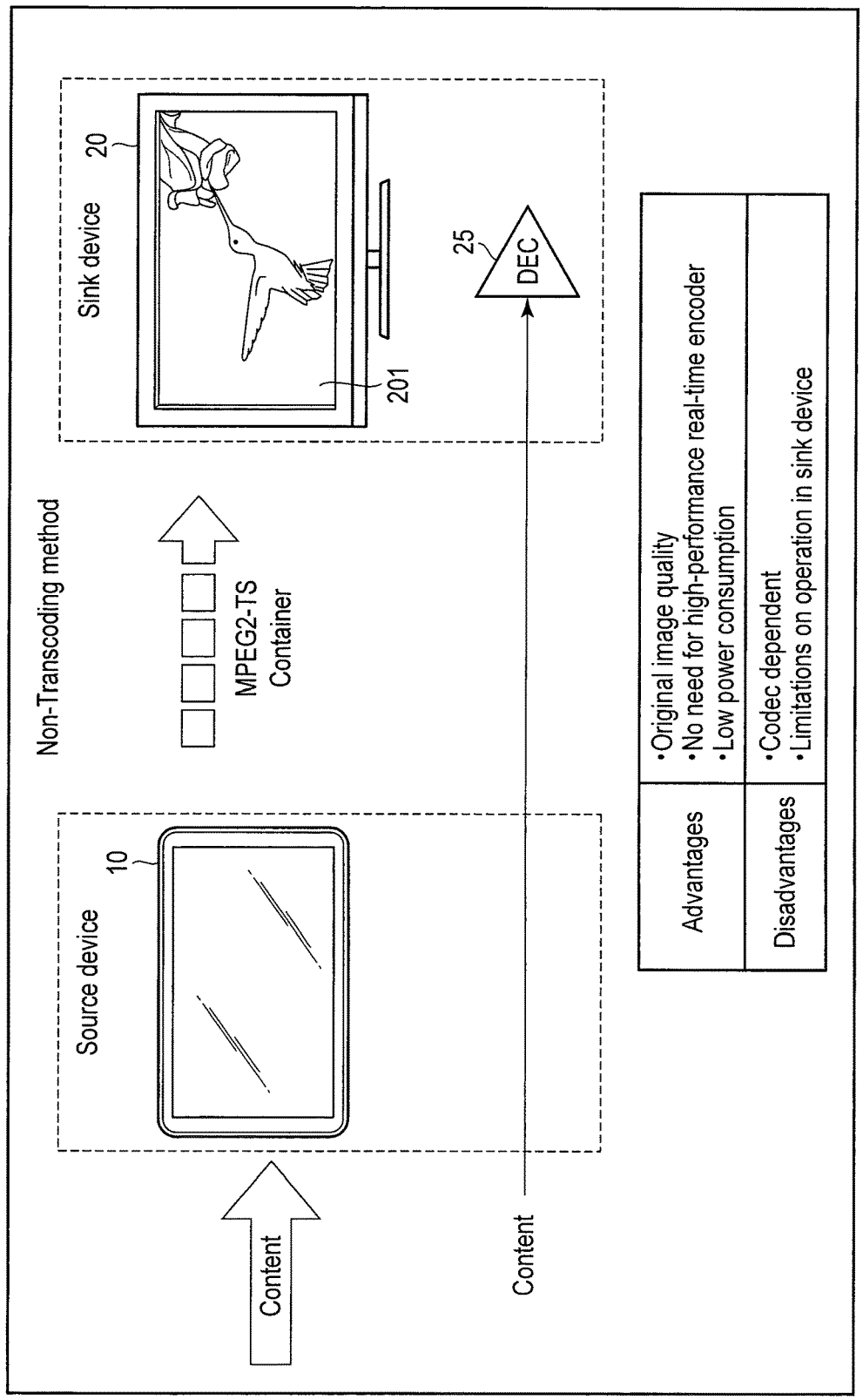
F I G. 4

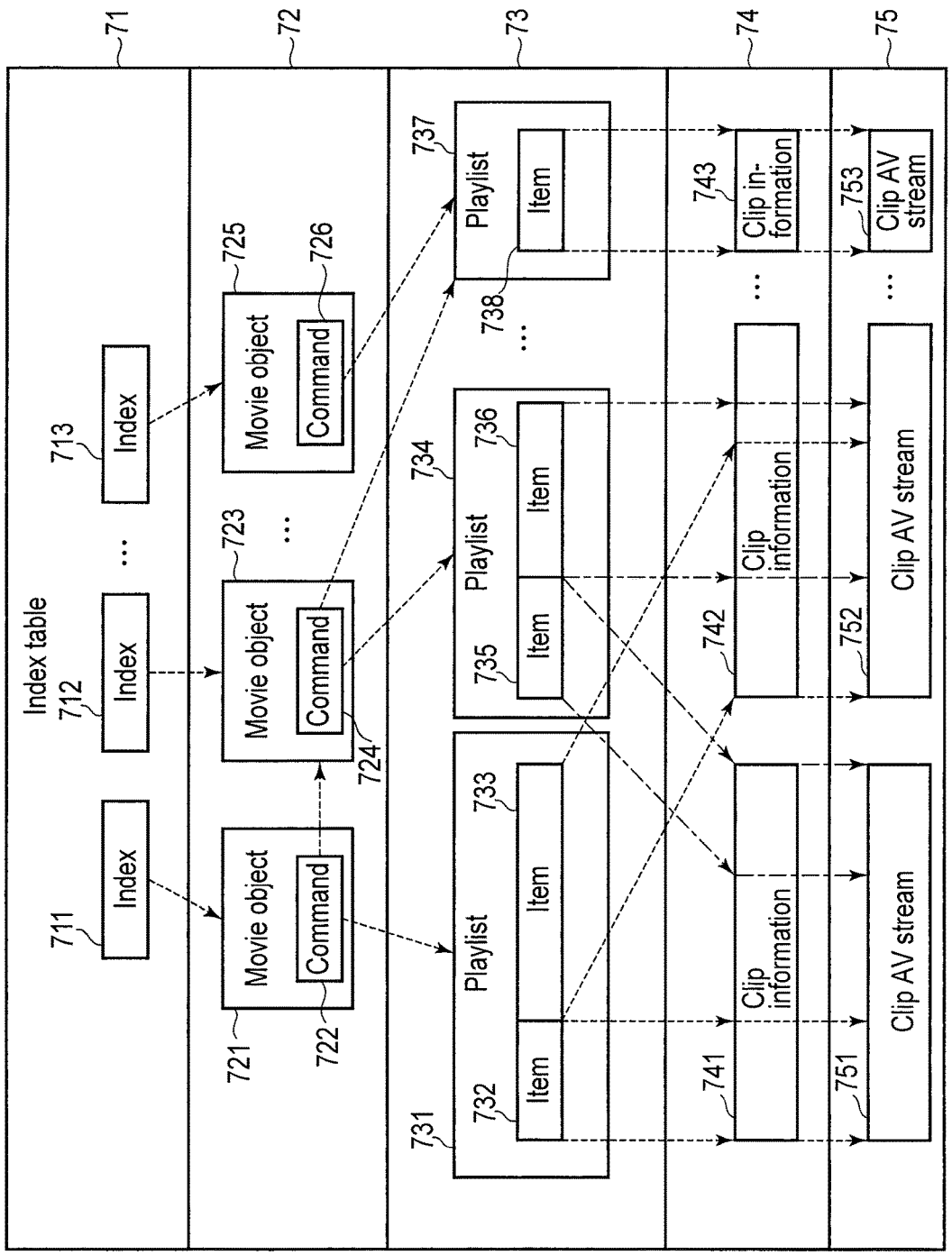
F I G. 5

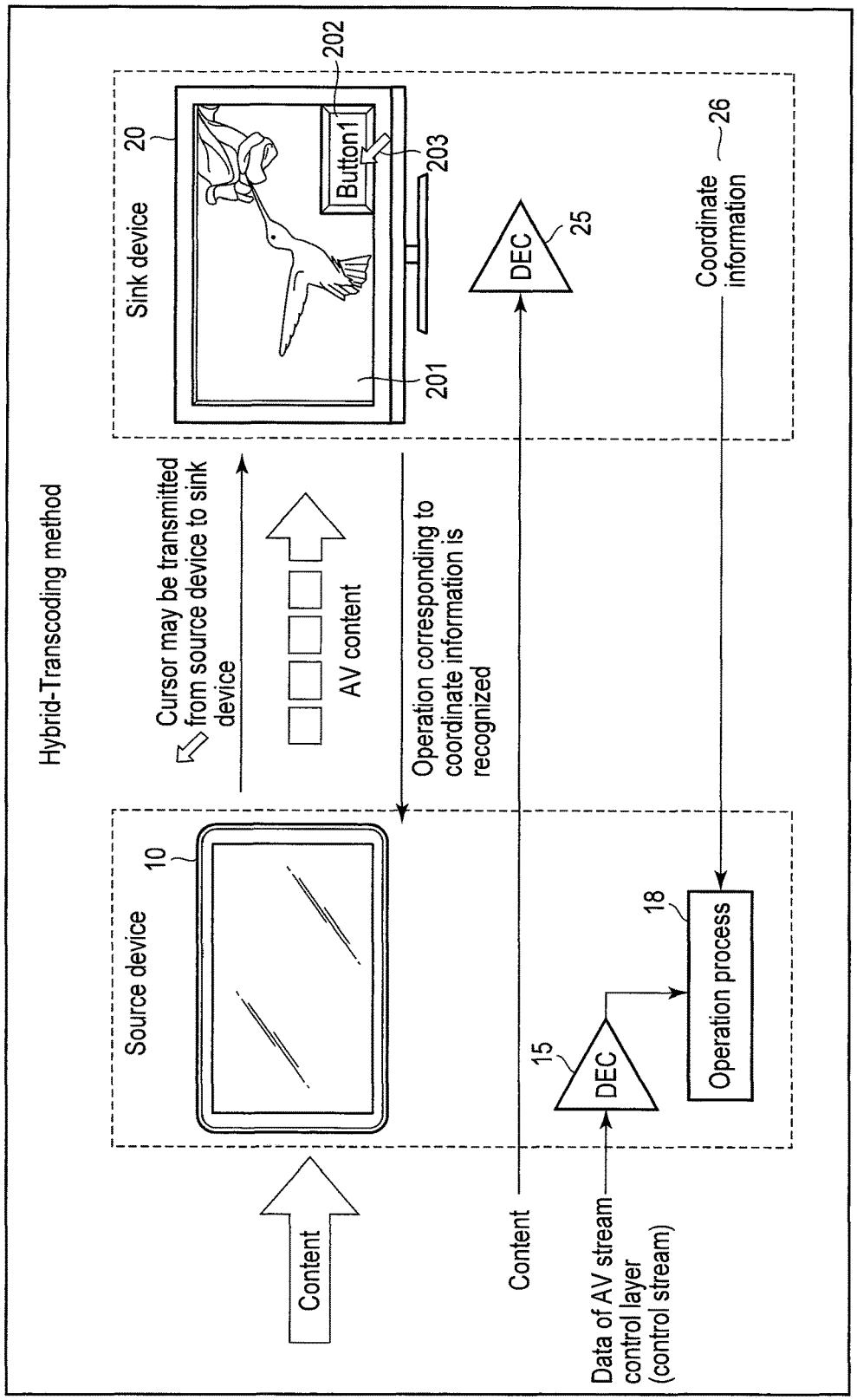
F I G. 11

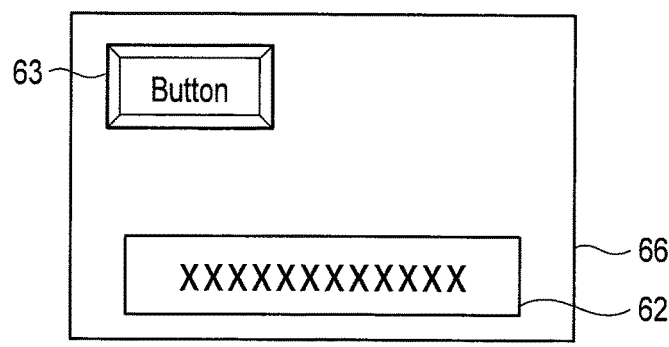
F I G. 1 2
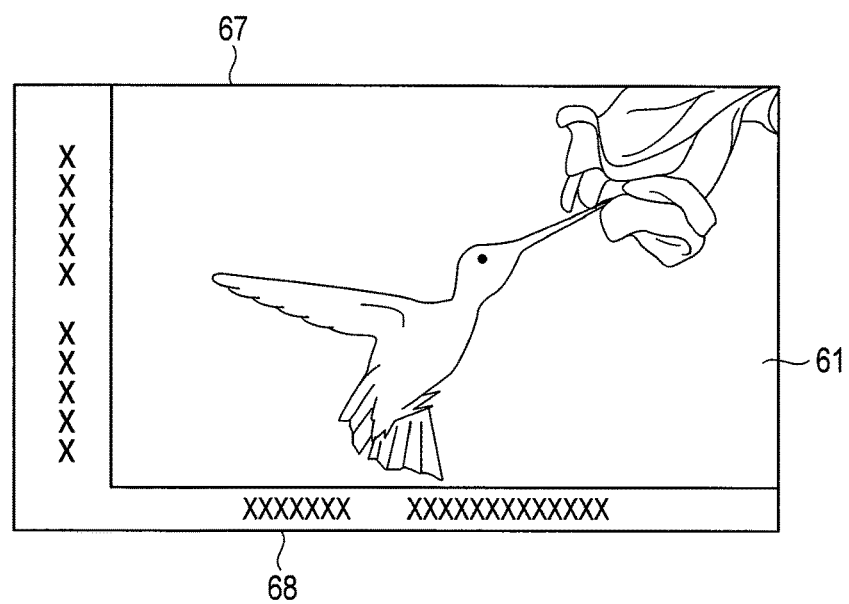
F I G. 1 3

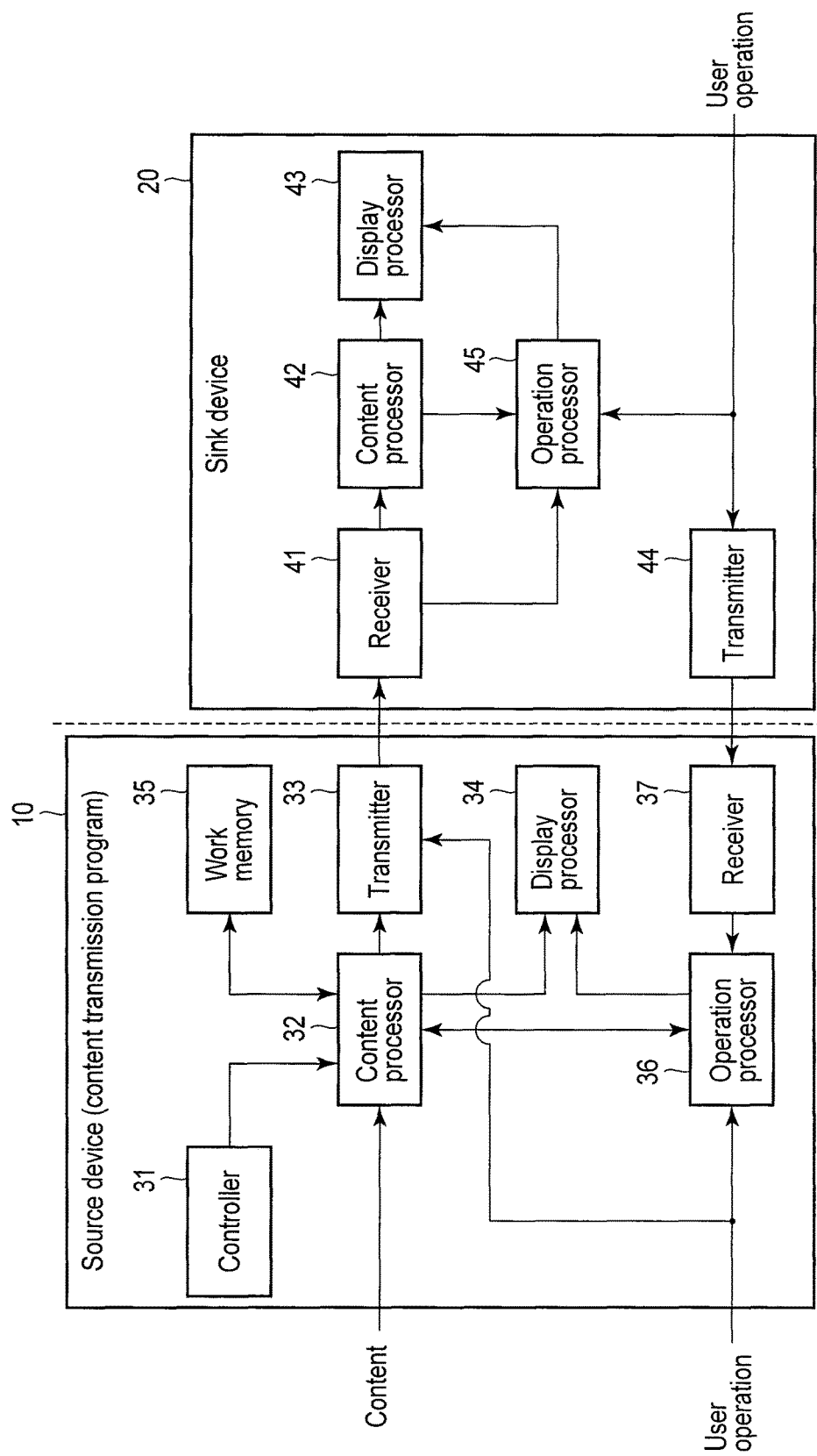
F I G. 14

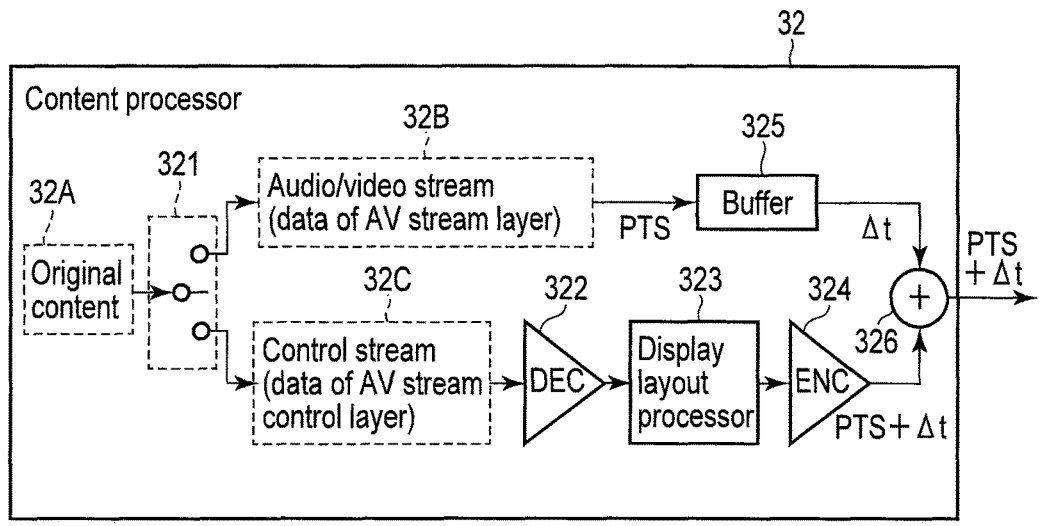
F I G. 1 8
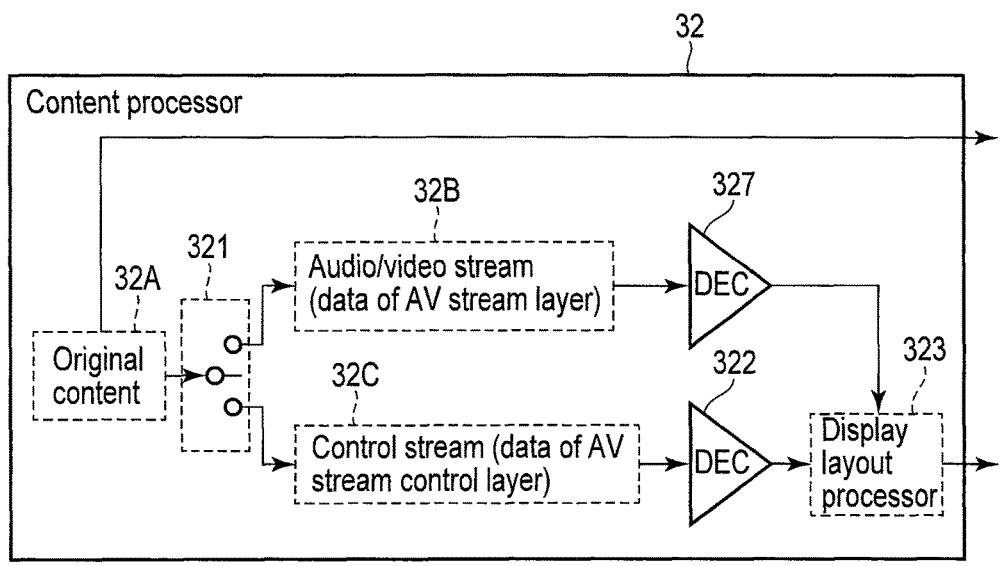
F I G. 1 9

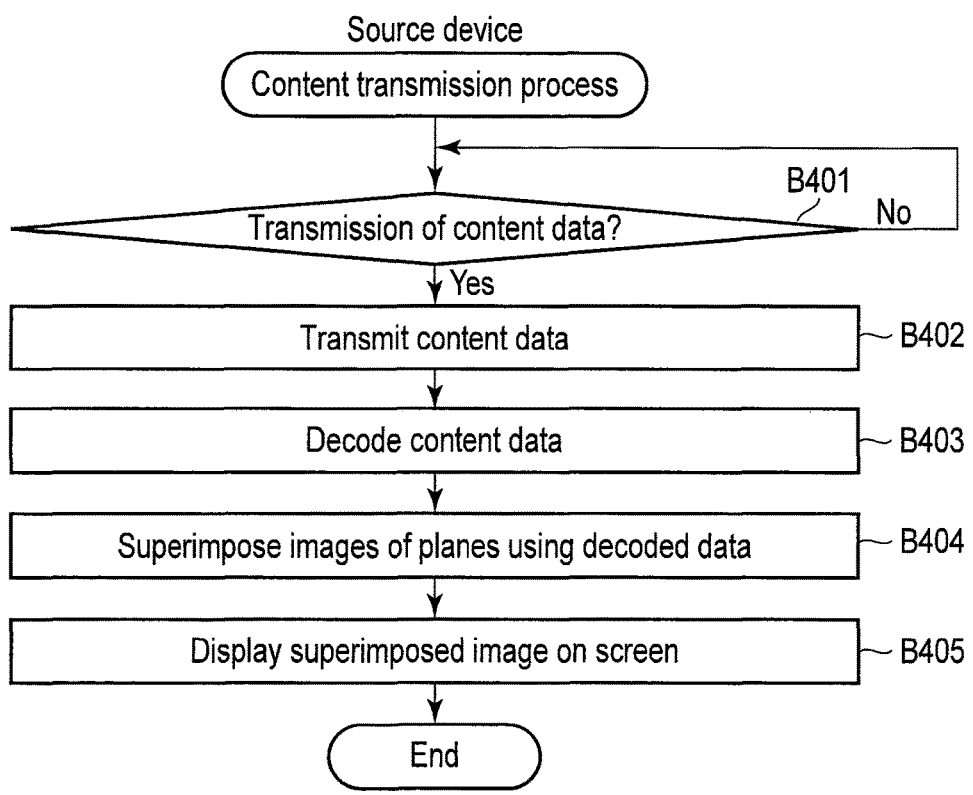
F I G. 27

ELECTRONIC APPARATUS AND COMMUNICATION CONTROL METHOD

CROSS-REFERENCE TO RELATED APPLICATIONS

This application is based upon and claims the benefit of priority from Japanese Patent Application No. 2013-214737, filed Oct. 15, 2013, the entire contents of which are incorporated herein by reference.

FIELD

Embodiments described herein relate generally to an electronic apparatus which transmits content data, and a communication control method applied to the electronic apparatus.

BACKGROUND

Wi-Fi Direct, which wirelessly connects two devices via no access point, has been used. As a technique using this Wi-Fi Direct, there is known a technique (Wi-Fi Display) which provides seamless display of content between wirelessly connected devices. Thereby, when viewing of content on a source device has been requested, the content can be displayed on the screen of a sink device. Thus, the user can view video, which is displayed on a small screen such as a screen of a smartphone or a tablet computer (source device), on a larger screen such as a screen of a television receiver (sink device). In this method, since the source device displays content on a screen of the source device, the source device decodes and displays the encoded original content data, and then re-encodes the decoded content and transmits the re-encoded content data to the sink device.

However, if the content is re-encoded as described above, there is a concern that the image quality is degraded. Considering this, the inventor thinks of a method of sending content as it is to the sink device, without decoding, and decoding the whole content on the sink device side. In the case of this method, since decode and re-encode are not executed, there is an advantage that the quality of original content can be maintained.

In the meantime, there is a case in which content includes not only video and audio, but also an object, such as a menu or a button, which can be operated by a user. However, in the method of sending content to the sink device without decoding, it may be possible not to properly process a user operation for an operation object when the operation object is displayed on the screen of the sink device.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary view for explaining transmission of content by a transcoding method.

FIG. 4 is an exemplary view for explaining transmission of content by a non-transcoding method.

FIG. 5 is a view illustrating an example of a data structure of content data which is transmitted by the electronic apparatus of the embodiment.

FIG. 11 is a view for describing still another example in which content is transmitted by a hybrid-transcoding method by the electronic apparatus of the embodiment.

FIG. 12 is a view illustrating an example of an image (operation screen) of a control layer which is displayed by the electronic apparatus of the embodiment.

FIG. 13 is a view illustrating another example of an image which is displayed by using content data that is transmitted by the electronic apparatus of the embodiment.

FIG. 14 is a block diagram illustrating a functional configuration of a content transmission program executed by the electronic apparatus of the embodiment.

FIG. 18 is a block diagram illustrating a fourth example of the functional configuration of the content processor in the content transmission program of FIG. 14.

FIG. 19 is a block diagram illustrating a fifth example of the functional configuration of the content processor in the content transmission program of FIG. 14.

FIG. 27 is a flowchart illustrating a fourth example of the procedure of the content transmission process executed by the electronic apparatus (source device) of the embodiment.

DETAILED DESCRIPTION

Various embodiments will be described hereinafter with reference to the accompanying drawings.

In general, according to one embodiment, an electronic apparatus includes a decoder, a transmitter and an operation processor. The decoder is configured to decode a control stream in encoded content data, the encoded content data including an audio/video stream and the control stream for controlling the audio/video stream. The transmitter is configured to transmit the audio/video stream and the control stream to an external electronic apparatus, wherein first time information is added to the audio/video stream and second time information is added the control stream. The operation processor is configured to execute, in response to a user operation in the external electronic apparatus, a process corresponding to the user operation by using the decoded control stream while video using the audio/video stream and the control stream is being displayed on a screen of the external electronic apparatus.

Figure 1:
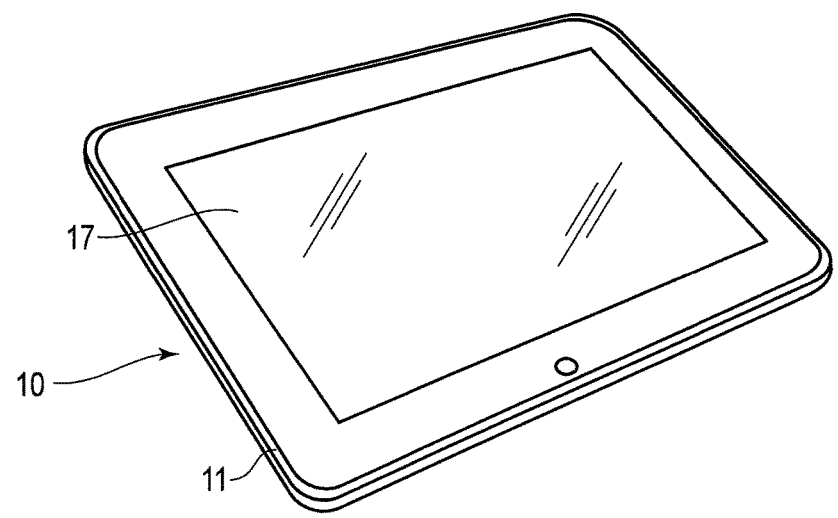
FIG. 1 is a perspective view illustrating an example of an external appearance of an electronic apparatus according to an embodiment.

FIG. 1 is a perspective view illustrating an external appearance of an electronic apparatus according to an embodiment. The electronic apparatus may be realized as a tablet computer, a notebook-type personal computer, a smartphone, a PDA, or an embedded system which is built in various kinds of electronic apparatuses such as a digital camera. In the description below, the case is assumed that this electronic apparatus is realized as a tablet computer 10. The tablet computer 10 is a portable electronic apparatus which is also called "tablet" or "slate computer". As shown in FIG. 1, the tablet computer 10 includes a main body 11 and a touch screen display 17. The touch screen display 17 is attached such that the touch screen display 17 is laid over the top surface of the main body 11.

The main body 11 has a thin box-shaped housing. In the touch screen display 17, a flat-panel display and a sensor, which is configured to detect a touch position of a pen or a finger on the screen of the flat-panel display, are assembled. The flat-panel display may be, for instance, a liquid crystal display (LCD). As the sensor, for example, use may be made of an electrostatic capacitance-type touch panel, or an electromagnetic induction-type digitizer.

Figure 2:
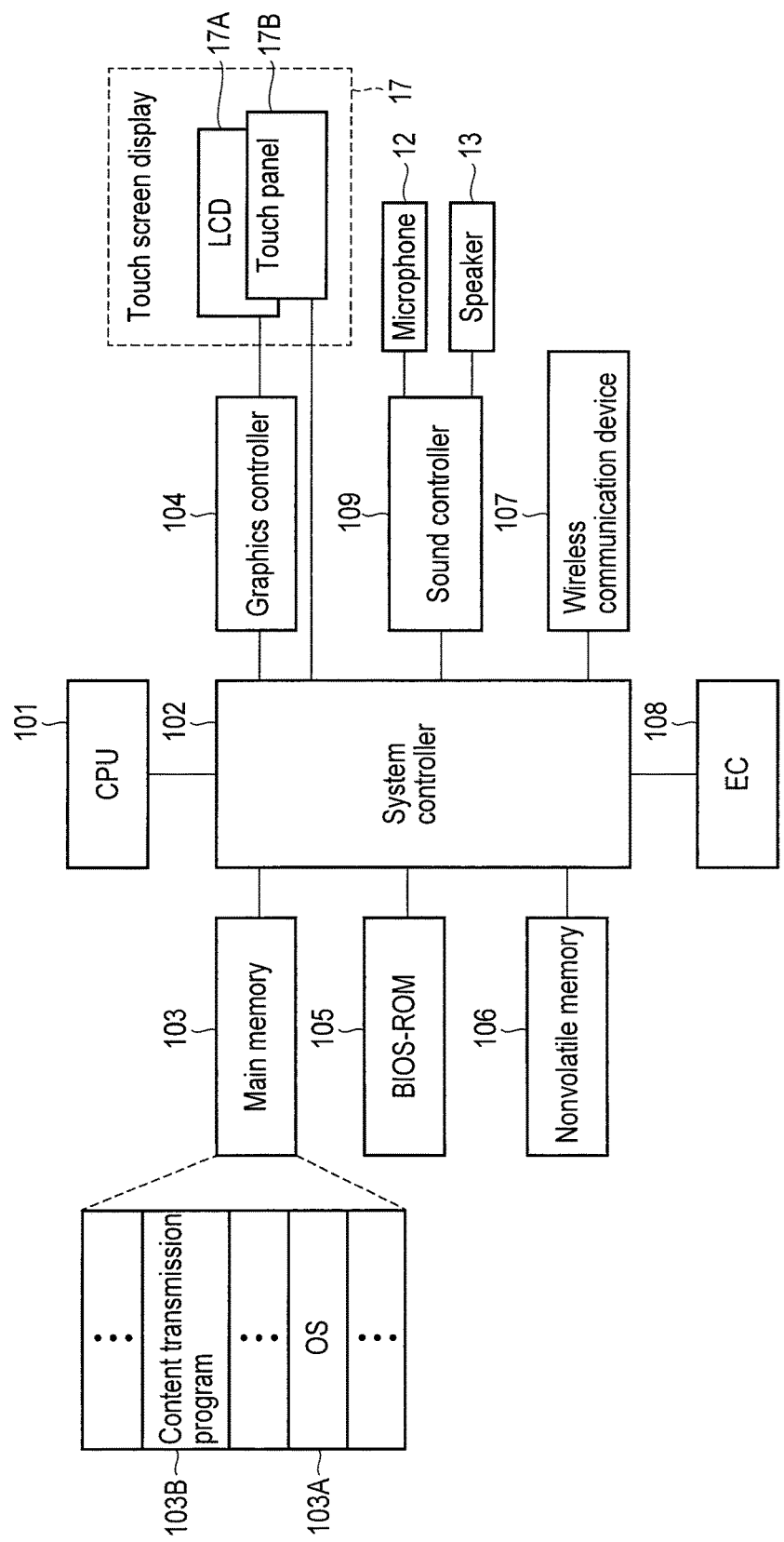
FIG. 2 is a block diagram illustrating an example of a system configuration of the electronic apparatus of the embodiment.

FIG. 2 shows a system configuration of the tablet computer 10.

As shown in FIG. 2, the tablet computer 10 includes a CPU 101, a system controller 102, a main memory 103, a graphics controller 104, a BIOS-ROM 105, a nonvolatile memory 106, a wireless communication device 107, an embedded controller (EC) 108, and a sound controller 109.

The CPU 101 is a processor which controls the operations of various components in the tablet computer 10. The CPU 101 executes various kinds of software, which are loaded from the nonvolatile memory 106 that is a storage device into the main memory 103. The software includes an operating system (OS) 103A and various application programs. The application programs include a content transmission program 103B. The content transmission program 103B includes, for example, a content data transmission/display function for seamlessly displaying content on a screen of an external electronic apparatus (sink device), with the tablet computer 10 being used as a source device.

In addition, the CPU 101 executes a basic input/output system (BIOS) which is stored in the BIOS-ROM 105. The BIOS is a program for hardware control.

The system controller 102 is a device which connects a local bus of the CPU 101 and various components. The system controller 102 includes a memory controller which access-controls the main memory 103. In addition, the system controller 102 includes a function of communicating with the graphics controller 104 via, e.g. a PCI EXPRESS serial bus.

The graphics controller 104 is a display controller which controls an LCD 17A that is used as a display monitor of the tablet computer 10. A display signal, which is generated by the graphics controller 104, is sent to the LCD 17A. The LCD 17A displays a screen image based on the display signal. A touch panel 17B is disposed on the LCD 17A.

The system controller 102 also includes a function of communicating with the sound controller 109. The sound controller 109 is a sound source device and outputs audio data that is a playback target to a speaker 13 or the like. In addition, the sound controller 109 outputs audio data, which has been detected by a microphone 12, to the system controller 102.

The wireless communication device 107 is a device configured to execute communication based on, for example, IEEE 802.11n and Wi-Fi Direct. The wireless communication device 107 can establish a wireless connection between devices via no access point. Incidentally, the wireless communication device 107 may be a device configured to execute wireless communication such as wireless LAN or 3G mobile communication, or may be a device configured to execute wired communication such as wired LAN.

The EC 108 is a one-chip microcomputer including an embedded controller for power management. The EC 108 includes a function of powering on or powering off the tablet computer 10 in accordance with an operation of a power button by the user.

As described above, the tablet computer 10 includes the function of seamlessly displaying content on a connected external electronic apparatus. This function is realized by using, for example, a technique (Wi-Fi Display) which provides seamless display of content between wirelessly connected devices by using Wi-Fi Direct which wirelessly connects two devices via no access point. By this function, when viewing of content on the tablet computer 10 (hereinafter, also referred to as "source device") is requested, the content (video, image, audio) can be output to a display or a speaker of an external electronic apparatus (also referred to as "sink device"). Thus, the user can view, for example, video, which is displayed on a small screen such as a screen of the tablet computer 10, on a larger screen such as a screen of a television receiver.

A transcoding method, for example, is used for the transmission of content between the devices. However, when the codec of original content can be decoded on the sink device side, it may be possible to use transmission by a non-transcoding method.

As illustrated in FIG. 3, in the transmission by the transcoding method, the source device 10 transcodes content data to a codec (e.g. H.264 in the case of video data) which can be decoded by the sink device 20, and transmits the transcoded content data to the sink device 20. Specifically, a decoder 15 of the source device 10 decodes the content data, an encoder 16 re-encodes the decoded content data, and the re-encoded content data is transmitted to the sink device 20. The source device 10 displays content (video) 171 on the screen of the source device 10 by using the decoded content data. In the meantime, the encoder 16 may capture an image of the content 171 displayed on the screen, and may encode (re-encode) the captured image.

On the other hand, the sink device 20 receives the transcoded content data from the source device 10 with, for example, an MPEG2-TS container, decodes the content data by a decoder 25, and displays content (video) 201 on the screen of the sink device 20.

In this manner, in the transmission by the transcoding method, since the transcoded content data is transmitted to the sink device 20, the content 201 can be displayed on the screen of the sink device 20, regardless of the codec of the original content data. However, in the transmission by the transcoding method, it is possible that the image quality is degraded by transcoding (re-encoding). Moreover, in order to transmit content from the source device 10 to the sink device 20 with very little delay, the encoder 16 in the source device 10 needs to be a real-time encoder which can encode content data in real time, and the power consumption for the encoder 16 increases accordingly.

On the other hand, as illustrated in FIG. 4, in the transmission by the non-transcoding method, the source device 10 transmits original content data just as it is to the sink device 20. In the sink device 20, the decoder 25 decodes the original content data, and displays content (video) 201 on the screen of the sink device 20. Since the content data has not been transcoded (i.e. neither decoded nor encoded) in the source device 10, no content is displayed on the screen of the source device 10.

In this manner, in the transmission by the non-transcoding method, video can be displayed with the original image quality on the screen of the sink device 20. In addition, since the content data is neither decoded nor encoded in the source device 10, the power consumption can be decreased, and a high-performance real-time encoder (an encoder capable of processing a large-sized image in real time) is needless. However, in the transmission by the non-transcoding method, it is necessary that the sink device 20 be able to decode the original content data, that is, be adaptive to the codec of the original content data.

In the meantime, in some cases, content data includes not only data of video or audio, but also data of an object such as a menu or a button which can be operated by the user (i.e. an interactive object).

FIG. 5 illustrates an example of a data structure of content data. This content data is, for example, content data stored in an optical disc such as a Blu-ray Disc® or a DVD, content data received by a terrestrial digital broadcast signal or a data broadcast signal, content data delivered by a streaming server, or content data stored (recorded) in the source device 10.

The content data includes a plurality of layers for managing an audio/video stream. The plural layers include, for example, an index table layer 71, a movie object layer 72, a playlist layer 73, a clip information layer 74, and a clip AV stream layer 75.

In the index table layer 71, indexes 711, 712 and 713 in contents corresponding to titles and menus are specified. The index 711, 712, 713 is indicative of an entry point in content for a title or a menu, which is accessed (operated) by the user. Each of the indexes 711, 712 and 713 is associated with a movie object 721, 723, 725, which is executed in response to selection of a corresponding title or menu. For example, the index 711 is associated with the movie object 721, the index 712 is associated with the movie object 723, and the index 713 is associated with the movie object 725.

In the movie object layer 72, the movie objects 721, 723 and 725 are specified. The movie objects 721, 723 and 725 are composed of executable navigation command programs (commands) 722, 724 and 726. In the navigation command program 722, 724, 726, a dynamic playback scenario using a playlist or another movie object can be described. For example, in the navigation command program 722, 724, 726, a scenario in which a plurality of playlists are successively played back, or a scenario in which that one of two playlists corresponds to a state at a time of execution or a user operation (a scenario with conditional branching) is played back, can be described.

For example, in the navigation command program 722 of the movie object 721, a playback scenario using a playlist 731 and movie object 723 is described. In the navigation command program 724 of the movie object 723, a playback scenario using a playlist 734 and a playlist 737 is described. In the navigation command program 726 of the movie object 725, a playback scenario using the playlist 737 is described.

In the playlist layer 73, the playlists 731, 734 and 737 are specified. Each of the playlists 731, 734 and 737 includes at least one playback target item. For example, the playlist 731 includes an item 732 and an item 733, the playlist 734 includes an item 735 and an item 736, and the playlist 737 includes an item 738. Each of the items 732, 733, 735, 736, and 738 is indicative of a playback portion in a clip (audio/video), and is expressed by, for example, a start position and an end portion on a time axis of the clip.

In the clip information layer 74, pieces of clip information 741, 742 and 743 are specified. Each of the pieces of clip information 741, 742 and 743 includes information relating to a corresponding clip audio/vide stream (clip AV stream) 751, 752, 753. The clip information includes information for converting a position (time stamp) on the time axis of the clip to a position on data of the clip AV stream.

The clip AV stream layer 75 includes clip AV streams 751, 752 and 753. For example, MPEG2-transport stream (MPEG2-TS) is stored in a clip AV stream. The payload of PES packets of the MPEG2-TS includes, for example, an encoded audio/video stream (audio stream, video stream), a graphics stream (interactive graphics (IG) stream, a presentation graphics (PG) stream), and a text stream.

In the present embodiment, when such content data is transmitted, an AV stream layer corresponding to audio and video and an AV stream control layer for controlling the audio and video are discriminated and transmitted. The AV stream layer includes, for example, an audio/video stream (AV stream) in the clip AV stream layer 75. The AV stream control layer (control stream) includes data for specifying a data position on an audio/video stream of the AV stream layer, this data position corresponding, at a time when a playback position of content is changed in response to a user operation, to this playback position. The AV stream control layer includes the index table layer 71, movie object layer 72, playlist layer 73, clip information layer 74, and the IG stream and PG stream (or text stream) in the clip AV stream layer 75. The stream (data) included in the AV stream control layer is also referred to as "control stream". Incidentally, the IG stream may be included in the AV stream control layer, and the PG stream and text stream may be included in the AV stream layer. In addition, the AV stream layer may include either the video stream or the audio stream.

To be more specific, the AV stream control layer (control stream) includes at least one of an index table, a movie object, clip information, on-screen display (OSD) information, and a sub-stream (Out-of-Mux stream) for providing a popup menu, a browsable slide show with background music, an operation button, sound at a time of button operation, an interactive menu, subtitle display by text, etc.

Figure 6:
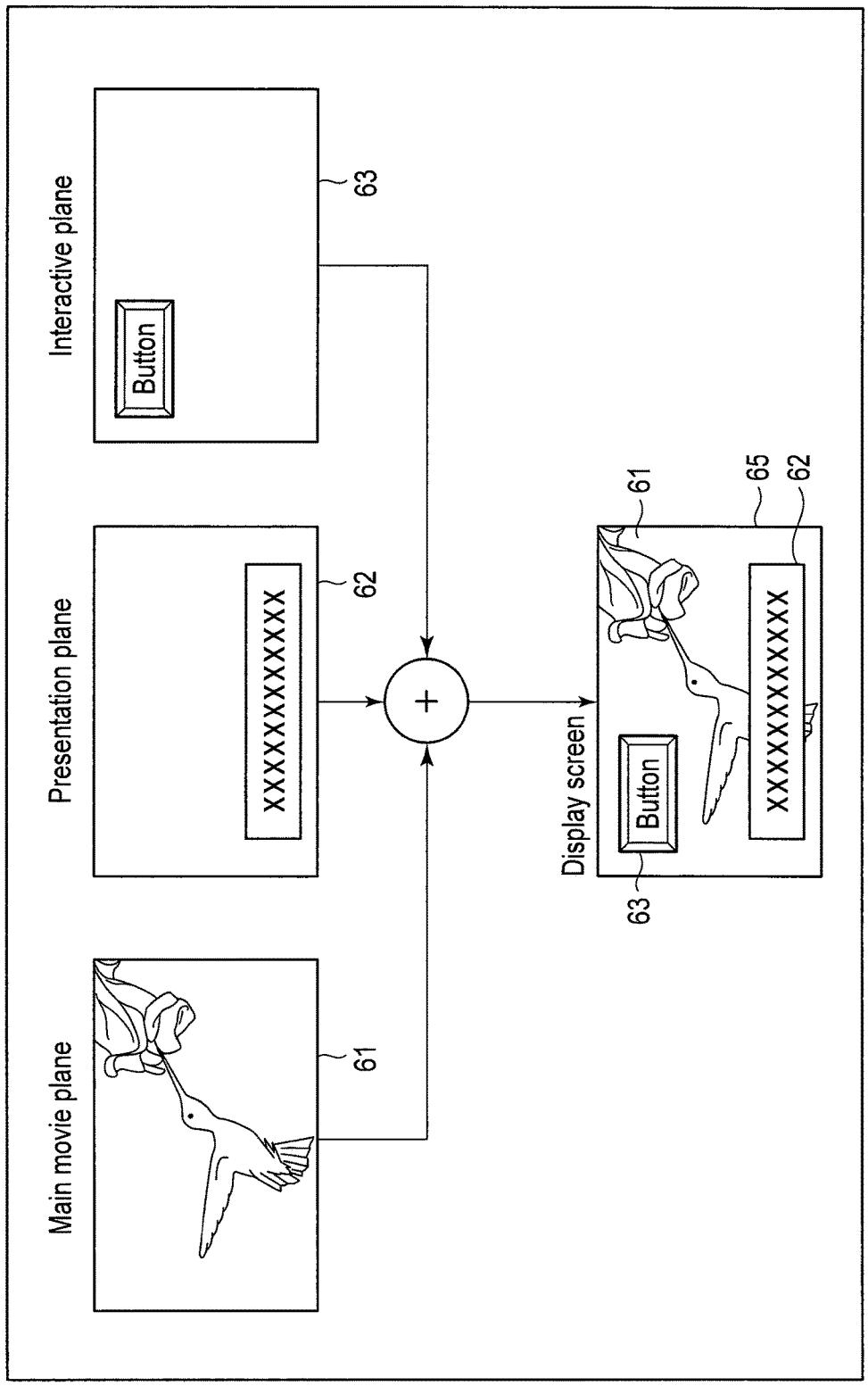
FIG. 6 is a view for describing an example of an image which is displayed by using content data which is transmitted by the electronic apparatus of the embodiment.

FIG. 6 illustrates an example of an image 65 displayed on the screen of the sink device 20 by using content data which has been transmitted. The display image 65 is generated by using a plurality of image planes 61, 62 and 63.

A main movie plane 61 corresponds to video in content, and is generated by using an audio/video stream. The audio/video stream is largest in size in the content data and, for example, as the image size (angle of view) becomes larger, the resources necessary for encoding the audio/video stream will increase.

A presentation plane 62 corresponds to information such as subtitles or decorative characters, and is generated by using a PG stream. The data size of the PG stream is, in usual cases, very small. The presentation plane 62 may be generated by using a text stream.

In addition, an interactive plane 63 corresponds to an operation object which is a target of a user operation, and is disposed on the screen, for example, as a button. In response to this button being selected (e.g. "click"), a predetermined action is executed. The interactive plane 63 is generated by using an IG stream.

These plural image planes 61, 62 and 63 are superimposed, and then the superimposed planes 61, 62 and 63 displayed as a single image 65 on the screen. By using these image planes 61, 62 and 63, for example, the video, subtitles and button can be independently controlled. Thus, compatibility can be given to contents, and the implementation for using contents can be made easier.

Figure 7:
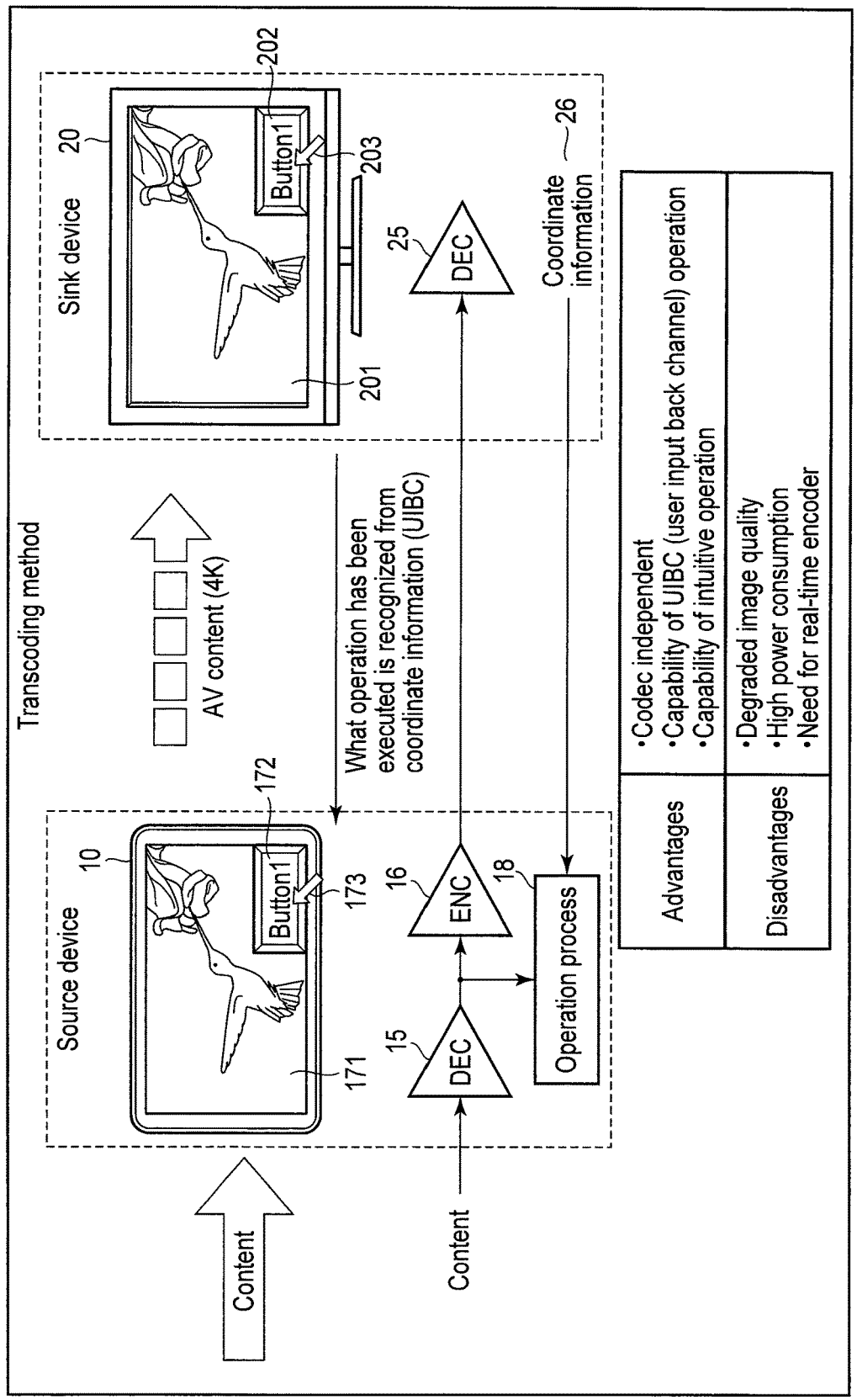
FIG. 7 is a view for describing an example in which a user operation is processed when content has been transmitted by the transcoding method of FIG. 3.
Figure 8:
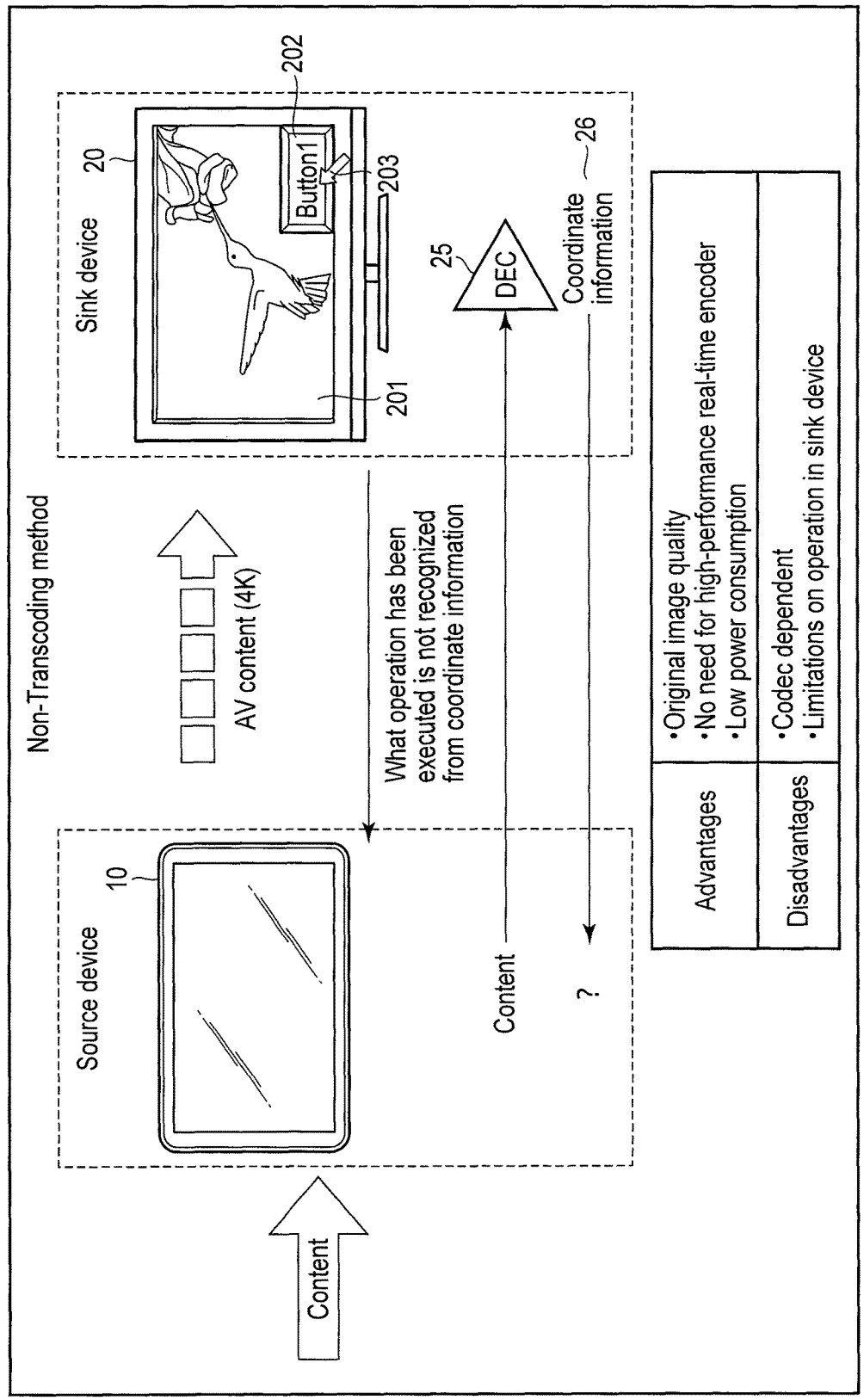
FIG. 8 is a view for describing an example in which a user operation cannot be processed when content has been transmitted by the non-transcoding method of FIG. 4.

Next, referring to FIGS. 7 and 8, a description is given of the transmission by the transcoding method and the transmission by the non-transcoding method in a case where content includes an object (interactive plane) which is an operation target, such as a button. This content is AV content of high-quality video, or so-called "4K", having a number of pixels which is four times greater than the number of pixels of Hi-Vision.

In the example illustrated in FIG. 7, as has been described above with reference to FIG. 3, in the transmission by the transcoding method, content data, which has been transcoded by the decoder 15 and encoder 16 of the source device 10, is transmitted to the sink device 20. On the screen of the source device 10, video (main movie plane) 171 and a button (interactive plane) 172 included in the content are displayed. In the meantime, a cursor 173 is an arrow image indicative of a position of a user operation designated by using a pointing device or the like.

In the sink device 20, the content data (i.e. transcoded content data), which has been received from the source device 10, is decoded by the decoder 25, and video (main movie plane) 201 and a button (interactive plane) 202 included in the content are displayed on the screen of the sink device 20. Incidentally, based on data relating to the cursor 173 on the screen of the source device 10 which has been transmitted from the source device 10, a cursor 203 corresponding to the cursor 173 may be displayed on the screen of the sink device 20.

If a user operation for content (e.g. an operation of pressing the button 202) is performed on the sink device 20 while the content is being displayed on the screen of the sink device 20, the sink device 20 uses a user input back channel (UIBC) function. The sink device 20 transmits coordinate information 26 corresponding to the user operation to the source device 10 by using this user input back channel (UIBC) function. The UIBC is a communication channel established between devices in order to transmit/receive data relating to an input by the user.

The source device 10 receives, with the UIBC, the coordinate information corresponding to the user operation from the sink device 20. Then, the source device 10 recognizes the user operation corresponding to the coordinate information 26 by using the content data decoded by the decoder 15, executes an operation process 18 corresponding to the user operation, and reflects the process result on the screen of the sink device 20. Specifically, the same content (image) based on the user operation can be displayed on the screen of the source device 10 and the screen of the sink device 20.

Also when a user operation for the content (for example, an operation of pressing a button 172) has been executed on the source device 10, the source device 10 executes the operation process 18 corresponding to the user operation by using the content data decoded by the decoder 15, and reflects the process result on the screen of the sink device 20.

In this manner, since the source device 10 decodes the content data, the source device 10 can execute, with very little delay, the process corresponding to the user operation in the source device 10 or sink device 20. Thus, the user can perform an intuitive operation on the displayed content which is transmitted from the source device 10 to the sink device 20.

However, as described above, the transmission by the transcoding method has such a disadvantage that the real-time encoder, which may possibly deteriorate the image quality due to transcoding, is necessary, and the power consumption increases accordingly.

In the example illustrated in FIG. 8, as has been described with reference to FIG. 4, in the transmission by the non-transcoding method, the original content data is transmitted from the source device 10 to the sink device 20. In the sink device 20, the decoder 25 decodes the received original content data, and the video (main movie plane) 201 and button (interactive plane) 202 in the content are displayed on the screen of the sink device 20. Incidentally, a cursor 203 is an arrow image indicative of a position of a user operation.

When content is being displayed on the screen of the sink device 20, if a user operation on the content is executed on the sink device 20, the sink device 20 transmits coordinate information 26 corresponding to the user operation to the source device 10. The source device 10 receives the coordinate information 26 corresponding to the user operation from the sink device 20. However, since the source device 10 does not decode the content data, the source device 10 is unable to recognize the user operation corresponding to the coordinate information 26, and cannot execute a process corresponding to the user operation.

The user operation on the content is executed, for example, by using an operation panel including a plurality of buttons. User operations using the operation panel may include not only operations which are common to various contents such as operations for controlling playback of content (e.g. playback, stop, pause, resume, fast forward, fast rewind, slow playback, etc.), but also operations depending on content, such as an operation for a move to a designated URL, or a chapter move operation for a transition to a specific position of content. It is thus difficult to prepare all commands corresponding to various user operations in advance, and to request execution of a process corresponding to a user operation from the sink device 20 to the source device 10 by using such commands. Accordingly, it is difficult to properly process a user operation, without decoding content data (data of the interactive plane) in the source device 10, and restrictions occur on the user operation in the transmission by the non-transcoding method.

In addition, for example, when content is being transmitted by the non-transcoding method and the user is unaware of whether the content is being transmitted by the transcoding method or the non-transcoding method, there is a concern that even if the user operates a button on the operation panel on the screen of the sink device 20, an operation corresponding to this operation is not executed, causing confusion in the operation by the user.

However, as described above, the transmission by the non-transcoding method is advantageous in that video can be displayed on the screen of the sink device 20 with the original image quality, the power consumption of the source device 10 can be reduced, and a high-performance real-time encoder is needless.

Taking the above into account, the present embodiment provides a function of seamlessly displaying content by a hybrid-transcoding method which has the advantages of the non-transcoding method and imposes no restrictions on the user operation in the sink device 20. In the transmission by the hybrid-transcoding, content data, in which at least an AV stream control layer (hereinafter, also referred to as "control layer") is decoded and at least an AV stream layer (also referred to as "stream layer") is not transcoded in the source device 10, is transmitted to the sink device 20.

Figure 9:
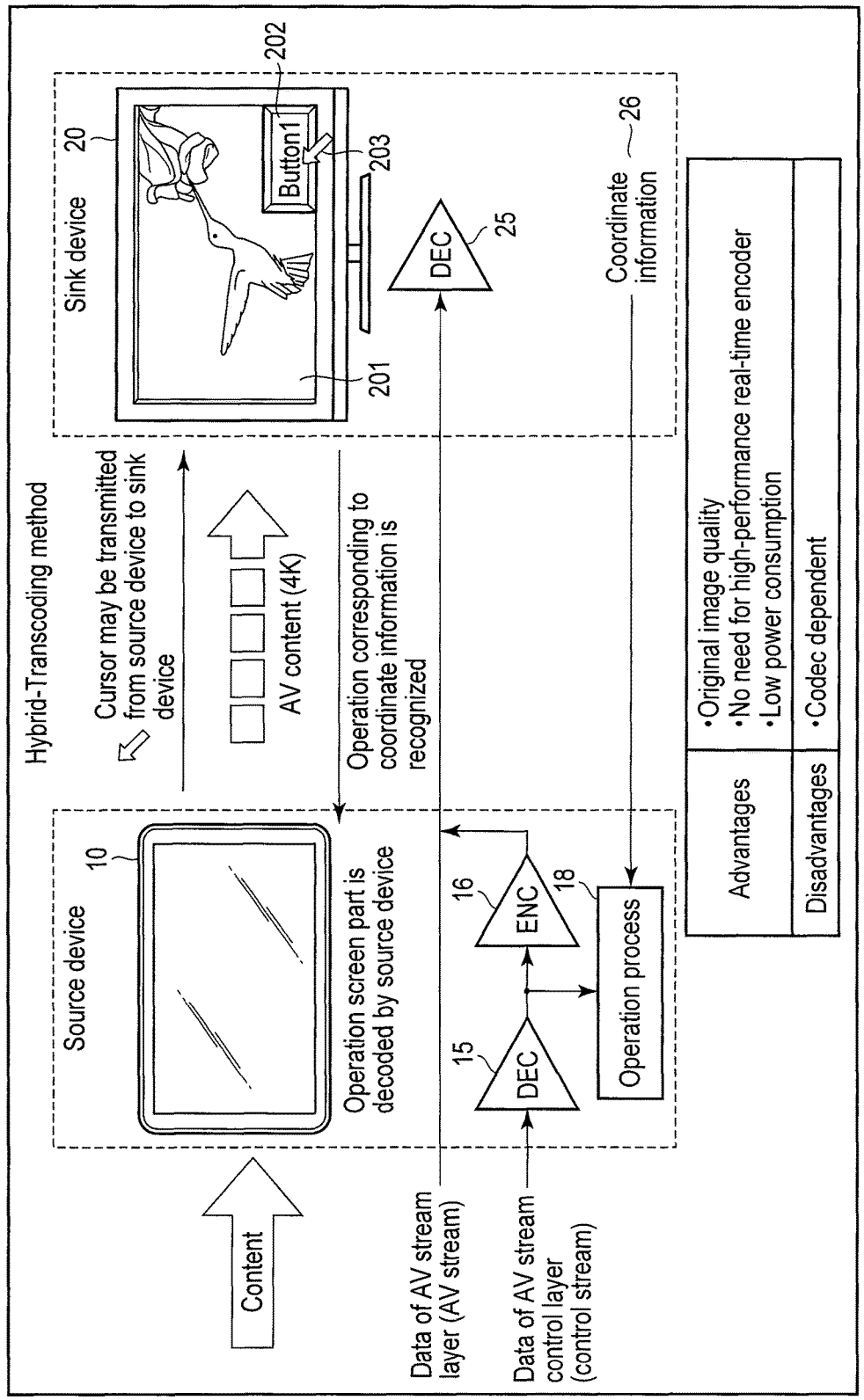
FIG. 9 is a view for describing an example in which content is transmitted by a hybrid-transcoding method by the electronic apparatus of the embodiment.
Figure 10:
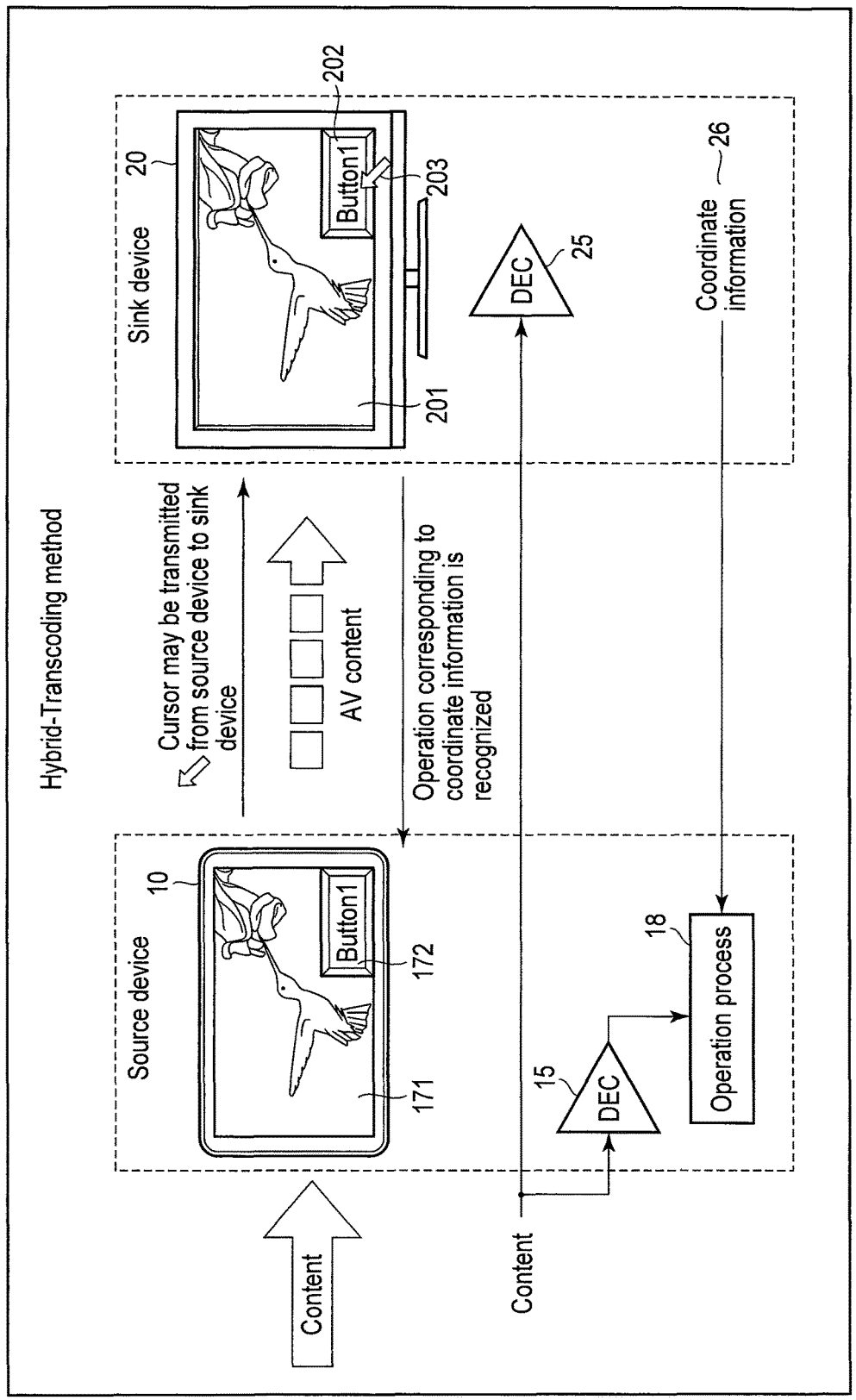
FIG. 10 is a view for describing another example in which content is transmitted by a hybrid-transcoding method by the electronic apparatus of the embodiment.

Referring to FIGS. 9 to 11, a description is given of examples in which content is transmitted by the hybrid-transcoding method.

In the example illustrated in FIG. 9, the source device 10 decodes data (control stream) corresponding to the control layer of content by the decoder 15, and encodes (re-encodes) the decoded data by the encoder 16. Specifically, the source device 10 transcodes the data corresponding to the control layer of content. Then, the source device 10 transmits the original data (original AV stream) corresponding to the stream layer of content and the transcoded data corresponding to the control layer to the sink device 20. In the meantime, the source device 10 may transmit to the sink device 20 the data relating to the cursor indicative of the position of a user operation.

The sink device 20 decodes, by the decoder 25, the original data corresponding to the stream layer of content and the transcoded data corresponding to the control layer, which have been received from the source device 10. Then, the sink device 20 displays on the screen the video (main movie plane) 201 and the operation screen (interactive plane) including the button 202, which are included in the content. The sink device 20 may display the cursor 203 on the screen of the sink device 20, based on the data relating to the cursor which has been transmitted from the source device 10.

When the content is being displayed on the screen of the sink device 20, if a user operation on the content (for example, an operation of pressing the button 202) is executed on the sink device 20, the sink device 20 transmits coordinate information 26 corresponding to the user operation to the source device 10 with the UIBC.

The source device 10 receives, with the UIBC, the coordinate information 26 corresponding to the user operation from the sink device 20. Then, the source device 10 recognizes the user operation corresponding to the coordinate information 26 by using the data of the control layer decoded by the decoder 15, executes an operation process 18 corresponding to the user operation, and reflects the process result on the screen of the sink device 20.

As a more concrete example, a case is now assumed that a user operation has been performed on the button 202 on the screen of the sink device 20 (for example, an operation of pressing the button 202 has been performed).

To begin with, the sink device 20 detects coordinates corresponding to a position designated (selected) by a user operation, that is, coordinates in the button 202, and transmits coordinate information 26 including the detected coordinates to the source device 10.

The source device 10 receives the coordinate information 26 from the sink device 20, and detects that the coordinates indicated by the received coordinate information 26 correspond to the coordinates of the button on the interactive plane, by using the decoded data of the control layer. Specifically, the source device 10 recognizes the user operation on the button 202 on the screen of the sink device 20 as being a user operation on the button on the interactive plane based on the decoded data of the control layer. Then, the source device 10 executes the operation process 18 corresponding to the user operation on this button, and reflects the process result on the screen of the sink device 20.

Examples of the operation process 18 include a content playback control process (e.g. playback, stop, pause, resume, fast forward, fast rewind, slow playback, etc.), a move process to a designated URL, and a chapter transition process. Some examples will now be described. When the button 202 is, for instance, a pause button, the source device 10 stops sending the main movie plane of content to the sink device 20, or continues transmission of a picture of the main movie plane at a paused content position. As regards the interactive plane, the source device 10 continues decoding and encoding of the interactive plane corresponding to the paused content position (time position/playback position), and transmits the encoded data to the sink device 20.

In addition, the source device 10 transmits, in fast forward or fast rewind, only a predetermined picture of plural pictures included in the main movie plane, and delays, in slow playback, a transmission timing of the main movie plane.

If the button 202 is a chapter transition button, the source device 10 reads the main movie plane from the content position corresponding to the chapter by executing the operation process 18, and transmits the main movie plane to the sink device 20. In addition, at this time, if the interactive plane and main movie plane are synchronized in the original content, the source device 10 executes decoding the interactive plane from the time position (playback position) corresponding to the chapter.

If the button 202 is a button for a move to a designated URL, the source device 10 accesses a Web page of this URL and displays the Web page. When the source device 10 displays the Web page, the source device 10 may encode the video displayed on the screen of the source device 10 and transmit the encoded data, by switching a transmission method from the hybrid-transcoding method to the transcoding method.

In addition, when a user operation on the content has been performed on the source device 10, the source device 10 executes the operation process 18 corresponding to this user operation, and reflects the process result on the screen of the sink device 20.

In this manner, since the source device 10 decodes the data of the control layer, the source device 10 can properly execute the process corresponding to the user operation in the source device 10 or the sink device 20, thereby improving the operability by the user. In addition, since the source device 10 transmits the original data of the stream layer to the sink device 20, video can be displayed with the original image quality on the screen of the sink device 20. Moreover, since the data of the stream layer is neither decoded nor encoded, the power consumption can be decreased, and a high-performance real-time encoder (an encoder capable of processing a large-sized image in real time) is needless.

In the example illustrated in FIG. 10, the source device 10 decodes content data (i.e. data of a stream layer and data of a control layer) by the decoder 15. Using the decoded data, the source device 10 displays on the screen the video (main movie plane) 171 and the operation screen (interactive plane) including the button 172, which are included in the content. In addition, the source device 10 transmits the original content data to the sink device 20. The source device 10 may transmit to the sink device 20 the data relating to the cursor indicative of the position of the user operation.

The sink device 20 decodes, by the decoder 25, the original content data which has been received from the source device 10. Then, the sink device 20 displays on the screen the video (main movie plane) 201 and the operation screen (interactive plane) including the button 202, which are included in the content. The sink device 20 can also display the cursor 203 on the screen of the sink device 20, based on the data relating to the cursor which has been transmitted from the source device 10.

When the content is being displayed on the screen of the sink device 20, if a user operation on the content is performed on the sink device 20, the sink device 20 transmits coordinate information 26 corresponding to the user operation to the source device 10 with the UIBC.

The source device 10 receives, with the UIBC, the coordinate information 26 corresponding to the user operation from the sink device 20. Then, the source device 10 recognizes the user operation corresponding to the coordinate information 26 by using the content data (the data of the control layer) decoded by the decoder 15, executes an operation process 18 corresponding to the user operation, and reflects the process result on the screen of the sink device 20.

In addition, if a user operation on the content is performed on the source device 10, the source device 10 executes, with use of the content data (the data of the control layer) decoded by the decoder 15, an operation process 18 corresponding to the user operation, and reflects the process result on the screen of the sink device 20.

In this manner, since the source device 10 decodes the content data, the source device 10 can properly execute a process corresponding to the user operation in the source device 10 or the sink device 20, thereby improving the operability by the user. In addition, since the source device 10 transmits the original content data to the sink device 20, the sink device 20 can display video with the original image quality on the screen of the sink device 20. Moreover, since decoded data is not encoded (re-encoded) in the source device 10, the power consumption can be decreased, and a high-performance real-time encoder (an encoder capable of processing a large-sized image in real time) is needless.

In the example illustrated in FIG. 10, the video (main movie plane) 171 included in the content is full-screen displayed. However, for example, if video of content is displayed on only a part of the screen (window display, etc.) in accordance with a user operation, the source device 10 may encode the entire video displayed on the screen of the source device and transmit the encoded video by switching the transmission method from the hybrid-transcoding method to the transcoding method. Conversely, the source device 10 may switch the transmission method from the transcoding method to the hybrid-transcoding method in response to content video being full-screen displayed during transmission by the transcoding method.

In the example illustrated in FIG. 11, the source device 10 decodes the data corresponding to the control layer of content by the decoder 15. In addition, the source device 10 transmits the original content data (the data of the stream layer and the data of the control layer) to the sink device 20. The source device 10 may transmit to the sink device 20 the data relating to the cursor indicative of the position of a user operation.

The sink device 20 decodes, by the decoder 25, the original content data which has been received from the source device 10. Then, the sink device 20 displays on the screen the video (main movie plane) 201 and the operation screen (interactive plane) including the button 202, which are included in the content. The sink device 20 may display the cursor 203 on the screen of the sink device 20, based on the data relating to the cursor which has been transmitted from the source device 10.

When the content is being displayed on the screen of the sink device 20, if a user operation on the content is executed on the sink device 20, the sink device 20 transmits coordinate information 26 corresponding to the user operation to the source device 10 with the UIBC.

The source device 10 receives, with the UIBC, the coordinate information 26 corresponding to the user operation from the sink device 20. Then, the source device 10 recognizes the user operation corresponding to the coordinate information 26 by using the data of the control layer decoded by the decoder 15, executes an operation process 18 corresponding to the user operation, and reflects the process result on the screen of the sink device 20.

In addition, if a user operation on the content is performed on the source device 10, the source device 10 executes, with use of the data of the control layer decoded by the decoder 15, an operation process 18 corresponding to the user operation, and reflects the process result on the screen of the sink device 20.

In this manner, since the source device 10 decodes the data of the control layer, the source device 10 can properly execute the process corresponding to the user operation in the source device 10 or the sink device 20, thereby improving the operability by the user. In addition, since the source device 10 transmits the original content data to the sink device 20, the sink device 20 can display video with the original image quality on the screen of the sink device 20. Moreover, since the data of the stream layer is neither decoded nor encoded and the data of the control layer is not encoded, the power consumption can be decreased, and a high-performance real-time encoder (an encoder capable of processing a large-sized image in real time) is needless.

In the meantime, when the content is transmitted by the hybrid-transcoding method, the source device 10 may display an image using the decoded data of the control layer on the screen of the source device 10.

FIG. 12 illustrates an example of an image 66 displayed on the screen of the source device 10. The case is now assumed that the data of the control layer includes an IG stream and a PG stream. In this case, the image 66 is generated by superimposing an interactive plane 63 corresponding to the IG stream and a presentation plane 62 corresponding to the PG stream, by using the decoded data of the control layer.

FIG. 13 illustrates another example of an image displayed on the screen of the sink device 20 by using content data which has been transmitted. This content data is, for instance, content data received by a terrestrial digital broadcast signal, and includes, for example, text data (text stream) of data broadcast.

A main movie plane 61, which is generated by using an audio/video stream in the content data, and character information 68, which is generated by using text data, are disposed in an image 67. The character information 68 may accept an operation by the user. In this case, based on the displayed character information 68, the user can perform a user operation by using, for example, a remote controller.

Even in the case of the content in which the character information 68 is displayed, the data corresponding to the character information 68 (the data of the control layer) is decoded in the source device 10 in the transmission by the above-described hybrid-transcoding method. Thus, the source device 10 can properly process the user operation.

Next, referring to FIG. 14, a description is given of an example of a functional configuration of the content transmission program 103B executed by the source device 10. The source device 10 includes a function of transmitting content data by the hybrid-transcoding method. Original content data is encoded by an arbitrary codec and includes an AV stream (data of an AV stream layer) for displaying video and a control stream (data of an AV stream control layer) for controlling the AV stream.

The source device 10 includes, for example, a controller 31, a content processor 32, a transmitter 33, a display processor 34, an operation processor 36, and a receiver 37. In addition, the sink device 20, which receives content, includes, for example, a receiver 41, a content processor 42, a display processor 43, a transmitter 44, and an operation processor 45.

The controller 31 of the source device 10 controls operations of the respective modules in the content transmission program 103B. The controller 31 controls processes (decode, encode, etc.) on content data by the content processor 32. The controller 31 outputs, for example, a control signal for enabling or disabling the function of the content processor 32 to the content processor 32. The content processor 32 may execute a process for displaying (outputting) content on the source device 10 and a process for transmitting content to the sink device 20, in accordance with a control signal output by the controller 31.

When content is transmitted to the sink device 20 by the hybrid-transcoding method, the content processor 32 and transmitter 33 transmit to the sink device 20 content data, at least a part of which is not transcoded (for example, content data in which an AV stream layer is not transcoded). The transmitter 33 transmits this content data to the sink device 20 via, for example, a wireless connection transmission path (e.g. a wireless connection transmission path based on Wi-Fi Direct) which is established between the source device 10 and sink device 20. In the meantime, before transmitting the content data, the transmitter 33 can notify the sink device 20 which transmission method of a transcoding method, a non-transcoding method and a hybrid-transcoding method is used to transmit the content data. Thereby, the sink device 20 can process the content data transmitted from the source device 10, in accordance with the notified transmission method. In addition, in accordance with the notified transmission method, the sink device 20 can notify the user of the current content transmission method by displaying information indicative of this transmission method on the screen.

The content processor 32 of the source device 10 decodes at least a part of the content data (e.g. the data of the AV stream control layer). Then, in accordance with a user operation in the source device 10 or the sink device 20, the operation processor 36 executes a process corresponding to this user operation by using at least a part of the content data decoded by the content processor 32.

Figure 15:
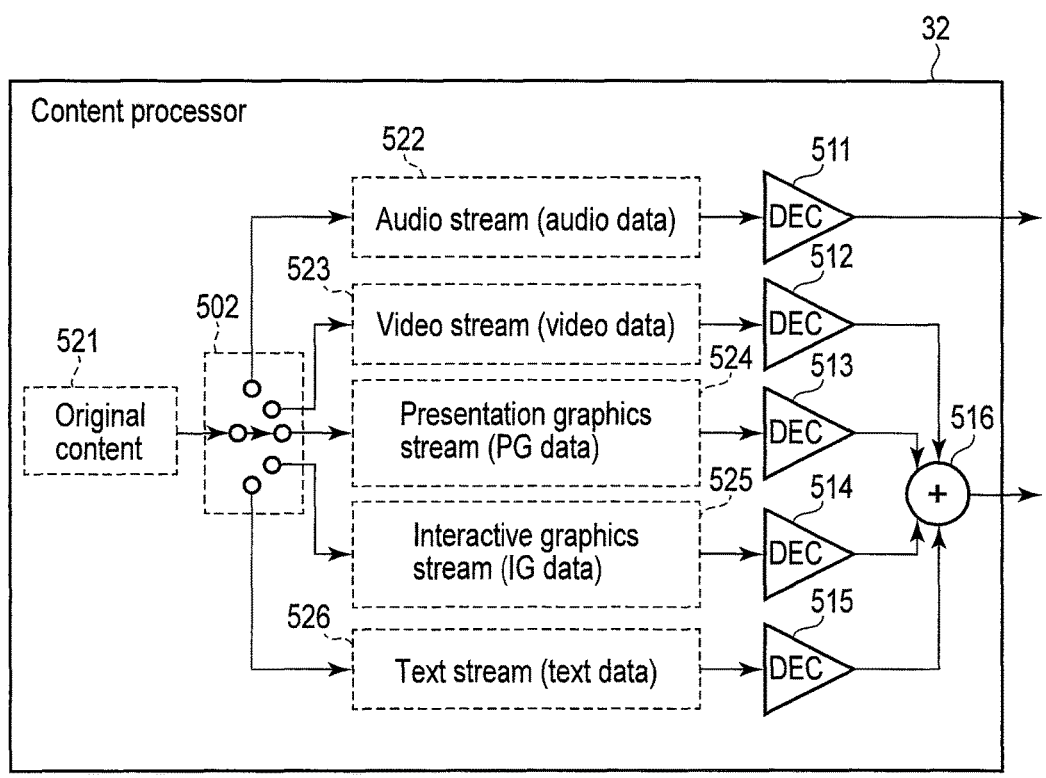
FIG. 15 is a block diagram illustrating a first example of the functional configuration of a content processor in the content transmission program of FIG. 14.

Referring now to FIG. 15, a description is given of an example of the functional configuration of the content processor 32 for displaying (outputting) content on the source device 10. The content processor 32 is configured to decode content data and to generate video displayed on the screen of the LCD 17A, and audio output to the speaker 13 or the like.

To begin with, a switch 502 divides content data 521 up and sends them to decoders 511 to 515 corresponding to layers (planes). An audio decoder 511 decodes a divided audio stream (audio data) 522. Thereby, audio, which is output by the speaker or the like, is generated.

A video decoder 512 decodes a divided video stream (video data) 523, thereby generating a video plane. A presentation graphics (PG) decoder 513 decodes a divided PG stream (PG data) 524, thereby generating a presentation plane. An interactive graphics (IG) decoder 514 decodes a divided IG stream (IG data) 525, thereby generating an IG plane. A text decoder 515 decodes a divided text stream (text data) 526, thereby generating text. A multiplexer 516 superimposes (multiplexes) the video plane, IG plane, PG plane, and text. Thereby, an image, which is displayed on the screen, is generated.

The display processor 34 may display the image, which has been generated by the content processor 32, on the screen of the source device 10 (LCD 17A). The audio, which has been generated by the content processor 32, may be output by the speaker, etc.

In the meantime, the operations of the above-described respective components in the content processor 32 may be enabled or disabled in response to an enable/disable signal by the controller 31. For example, in the case where the content data is transmitted by the hybrid-transcoding method, when video is not displayed on the screen of the source device (tablet computer) 10, the controller 31 outputs to the content processor 32 control signals which disable the video decoder 512 and audio decoder 511, and enable the PG decoder 513, IG decoder 514 and text decoder 515. Thereby, the data of the AV stream control layer (e.g. data relating to the IG plane, PG plane and text) is decoded, and the data of the AV stream layer (e.g. data relating to the video plane and audio) is not decoded. Specifically, the video decoder 512 and audio decoder 511 are caused to pass the data of the AV stream layer, and the PG decoder 513, IG decoder 514 and text decoder 515 are caused to decode the data of the AV stream control layer, which is necessary for processing a user operation.

Referring to FIGS. 16 to 19, a description is given of examples of the functional configuration of the content processor 32 for transmitting content data by the hybrid-transcoding method.

Figure 16:
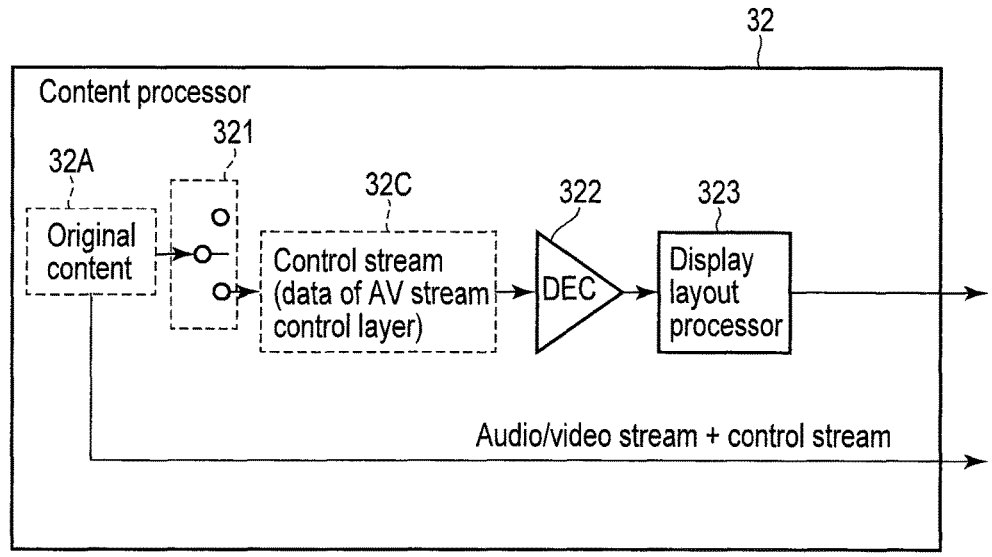
FIG. 16 is a block diagram illustrating a second example of the functional configuration of the content processor in the content transmission program of FIG. 14.

In the example illustrated in FIG. 16, the content processor 32 decodes a control stream 32C of encoded content data which is content data including an audio/video stream and the control stream 32C for controlling the audio/video stream. The content processor 32 passes original content data 32A (i.e. passes original content data 32A without processing the original content data 32A). The transmitter 33 then transmits to the sink device (external electronic apparatus) 20 the original content data 32A including the audio/video stream, to which first time information is added, and the control stream 32C, to which second time information is added. While the video using the audio/video stream and control stream 32C is being displayed on the screen of the sink device 20, the operation processor 36 executes, in response to a user operation in the sink device 20, a process corresponding to this user operation by using the control stream 32C which has been decoded by the content processor 32.

To be more specific, the content processor 32 includes a switch 321, a decoder 322 and a display layout processor 323.

The switch 321 divides the original content data 32A up and outputs the control stream 32C of the original content data 32A to the decoder 322. The decoder 322 decodes the control stream 32C. Then, the display layout processor 323 determines a layout (screen structure) of an image and text corresponding to the decoded control stream 32C. This text is, for instance, text based on data described by Java (trademark) or HTML. Based on the determined layout, the display layout processor 323 may generate an image of an operation screen including a button (operation object) and text for a user operation. In addition, the original content data 32A including the AV stream and control stream 32C passes through the content processor 32.

The transmitter 33 transmits to the sink device 20 the original content data 32A including the audio/video stream, to which the first time information is added, and the control stream 32C, to which the second time information is added. The first time information and second time information include time stamps corresponding to the AV stream which is transmitted. The first time information and second time information are used, for example, in order to synchronize the AV stream and the control stream 32C in the sink device 20. Incidentally, when the control stream 32C includes subtitle information (e.g. subtitle information by a PG stream or a text stream), a time stamp corresponding to the subtitle information (a time stamp which is added to subtitle information in advance) may be used as the second time information.

The display processor 34 may display an image of an operation screen, as shown in FIG. 12, on the screen of the source device 10. In addition, in accordance with a user operation on an operation object (operation screen) displayed on the screen of the source device 10, the transmitter 33 may transmit operation data indicative of this user operation to the sink device 20.

Figure 17:
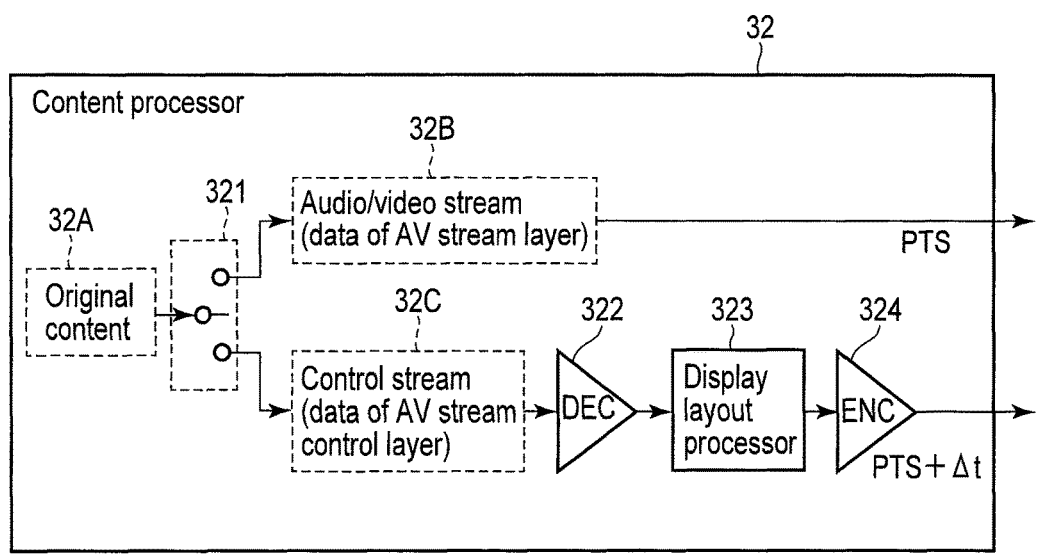
FIG. 17 is a block diagram illustrating a third example of the functional configuration of the content processor in the content transmission program of FIG. 14.

In the example illustrated in FIG. 17, the content processor 32 includes a switch 321, a decoder 322, a display layout processor 323, and an encoder 324.

The switch 321 outputs an audio/video stream 32B of the original content data 32A as it is. The transmitter 33 transmits to the sink device 20 the original audio/video stream 32B to which first time information including a time stamp PTS is added.

In addition, the switch 321 divides the original content data 32A up and outputs the control stream 32C of the original content data 32A to the decoder 322. The decoder 322 decodes the control stream 32C. The display layout processor 323 determines a layout (screen structure) of an image and text corresponding to the decoded control stream 32C. Based on the determined layout, the display layout processor 323 may generate an image of an operation screen including a button (operation object) and text for a user operation. Then, the encoder 324 encodes (re-encodes) the decoded control stream 32C. The encoder 324 encodes the decoded control stream 32C, for example, by a codec which is suitable for the process in the sink device 20. Specifically, the control stream 32C is transcoded by the decoder 322 and encoder 324 into a codec which is suitable for the process by the sink device 20.

Then, the transmitter 33 transmits to the sink device 20 the transcoded control stream 32C to which second time information including the time stamp PTS and a time Δt required for the process by the decoder 322, display layout processor 323 and encoder 324 is added. A time point, at which the transcoded control stream 32C is transmitted to the sink device 20 by the transmitter 33, delays, relative to a time point at which the AV stream 32B is transmitted, by the time required for the process by the decoder 322, display layout processor 323 and encoder 324. In order to notify the sink device 20 of this delay, the second time information, which is added to the transcoded control stream 32C, includes the delay time Δt. By using the first time information and second time information, the video and audio and the operation screen can be synchronized.

Incidentally, the above-described process by the decoder 322 or the process by the display layout processor 323 may not be necessary depending on the structure of the control stream 32C. Thus, for example, when the process by the display layout processor 323 is not executed, the time Δt included in the second time information is indicative of the time required for the process by the decoder 322 and the process by the encoder 324.

In addition, the display processor 34 may display an image of an operation screen on the screen of the source device 10.

The sink device 20 receives the AV stream 32B to which the first time information (time stamp PTS) is added, and receives the transcoded control stream 32C to which the second time information (time stamp PTS and delay time Δt) is added. Based on these first and second time information, the sink device 20 delays the first coming AV stream 32B by the delay time Δt by using a buffer (temporary storage buffer), and synchronizes the AV stream 32B and control stream 32C (i.e. corrects the time of the coming of the streams). The sink device 20 decodes the synchronized AV stream 32B and control stream 32C, and can display the video and operation screen on the screen of the sink device 20.

Incidentally, in order to synchronize the display images (video, operation screen) which are displayed on the screens of the sink device 20 and source device 10, the sink device 20 and source device 10 may exchange the time stamp PTS. For example, when the sink device 20 displays the video and the operation screen, the sink device 20 transmits the time stamp PTS corresponding to the displayed video (AV stream 32B) to the source device 10. Then, the source device 10 executes control such that the operation screen corresponding to the time stamp PTS may be displayed on the screen of the display.

In the example illustrated in FIG. 18, the content processor 32 includes a switch 321, a decoder 322, a display layout processor 323, and an encoder 324.

The switch 321 stores an audio/video stream 32B with a time stamp PTS in the original content data 32A, in a buffer 325.

The switch 321 divides the original content data 32A up and outputs a control stream 32C with a time stamp PTS in the original content data 32A to the decoder 322. The decoder 322 decodes the control stream 32C. The display layout processor 323 determines a layout (screen structure) of an image and text corresponding to the decoded control stream 32C. Based on the determined layout, the display layout processor 323 may generate an image of an operation screen including a button (operation object) and text for a user operation.

Then, the encoder 324 encodes (re-encodes) the decoded control stream 32C. The encoder 324 encodes the decoded control stream 32C, for example, by a codec which is suitable for the process by the sink device 20. Specifically, the control stream 32C is transcoded by the decoder 322 and encoder 324 into a codec which is suitable for the process by the sink device 20. The encoder 324 outputs the transcoded control stream 32C to a multiplexer 326. Incidentally, a time Δt has been taken in the process by the decoder 322, display layout processor 323 and encoder 324.

The buffer 325 delays the audio/video stream 32B by the time Δt, and outputs the audio/video stream 32B to the multiplexer 326. Thereby, the transcoded control stream 32C and the audio/video stream 32B can be synchronized.

The multiplexer 326 multiplexes the control stream 32C, for the processing of which the time Δt was required by the display layout processor 323 and encoder 324, and the audio/video stream 32B, which was delayed by the time Δt by the buffer 325. Thereby, the transmitter 33 can transmit the synchronized original audio/video stream 32B and transcoded control stream 32C as a single stream to the sink device 20. Accordingly, in the sink device 20, the content data can be processed without considering time information, and the process of a user operation on the content can be executed based on a precise time point.

In the meantime, the display processor 34 may display an image of an operation screen on the screen of the source device 10.

In the example illustrated in FIG. 19, the content processor 32 includes a switch 321, decoders 322 and 327, and a display layout processor 323.

The switch 321 divides the original content data 32A up, outputs an audio/video stream 32B of the original content data 32A to the decoder 327, and outputs a control stream 32C of the original content data 32A to the decoder 322.

The decoder 327 decodes the audio/video stream 32B, thereby generating video and audio. The decoder 322 decodes the control stream 32C. The display layout processor 323 determines a layout (screen structure) of an image and text corresponding to the decoded data. Based on the determined layout, the display layout processor 323 generates an image of an operation screen including a button (operation object) and text for a user operation.

Besides, the original content data 32A passes through the content processor 32. The transmitter 33 transmits the original content data 32A to the sink device 20. In addition, the display processor 34 superimposes the image of the operation screen on the video, and displays the superimposed image (video) on the screen of the source device 10.

The content processor 32 outputs the decoded control stream 32C to the operation processor 36. Further, the content processor 32 may save (store) in a work memory 35 at least a part of the decoded control stream 32C and at least a part of the audio/video stream 32B, which is related to at least this part of the decoded control stream 32C.

The receiver 41 of the sink device 20 receives the content data which has been transmitted from the source device 10 (transmitter 33). The content processor 42 decodes the content data, and generates an image (video) which is displayed on the screen, and audio which is output by the speaker or the like. The process by the content processor 42 is, for example, the same as the process described with reference to FIG. 15.

The display processor 43 displays the image (video), which has been generated by the content processor 42, on the screen of the sink device 20. The display processor 43 also outputs the audio, which has been generated by the content processor 42, by the speaker, etc. of the sink device 20.

The content (image) displayed on the screen of the sink device 20 may include an operation object (interactive plane) for a user operation, such as a button, as shown in FIG. 6. In the source device 10 and sink device 20, the user can execute an operation on the operation object by using a remote controller or various pointing devices. Examples of this user operation include operations for controlling playback of content (e.g. playback, stop, pause, resume, fast forward, fast rewind, slow playback, etc.), an operation for changing a display mode of content (e.g. full-screen display), an operation for a move to a designated URL, and an operation for varying a sound volume of content.

The user operation may be a user operation by voice with use of a microphone. The source device 10 or sink device 20 may detect a user operation by a command such as "playback" or "stop" from voice, by analyzing audio data which has been input with use of the microphone. In addition, the source device 10 or sink device 20 may detect from voice a user operation like a move, click or tap of a position designated by a pointing device such as a mouse.

Hereafter, a description is given of a process in a case where a user operation has been executed in the sink device 20 and a process in a case where a user operation has been executed in the source device 10.

To begin with, the case in which a user operation has been executed in the sink device 20 is described.

In response to detection of a user operation on an operation object displayed on the screen of the sink device 20, the transmitter 44 of the sink device 20 transmits operation data corresponding to this user operation to the source device 10. This operation data includes coordinate data indicative of a position on the screen of the sink device 20, at which the user operation was executed. The operation data may include time data (time stamp) indicative of a playback position on a time axis of video (content) at a time when the user operation was executed.

The receiver 37 of the source device 10 receives the operation data corresponding to the user operation from the sink device 20. The operation processor 36 recognizes the user operation which was detected in the sink device 20, by using the coordinate data in the operation data and the decoded control stream 32C. Based on the coordinates on the screen, which are indicated by the coordinate data, the operation processor 36 recognizes the operation object (e.g. button 202) operated by the user, for example, from the operation objects on the interactive plane. The operation processor 36 executes a process corresponding to the recognized user operation (i.e. a process corresponding to the user operation on the recognized operation object). Then, the transmitter 33 transmits content data corresponding to the process result to the sink device 20.

The operation processor 36 may execute the process corresponding to the user operation by using the coordinate data and time data in the operation data and the decoded control stream 32C. In this case, based on the playback position (playback time point) on the time axis indicated by the time data and the coordinates on the screen indicated by the coordinate data, the operation processor 36 recognizes the operation object operated by the user from the operation objects on the interactive plane corresponding to the playback position on the time axis. Then, the operation processor executes the process corresponding to the user operation on this operation object.

For example, when the user operation is an operation for controlling playback of content (e.g. playback, stop, pause, resume, fast forward, fast rewind, slow playback, etc.), the operation processor 36 and transmitter 33 transmit content data, which starts from the playback position corresponding to the user operation, to the sink device 20. If the user operation is an operation for a rewind to a predetermined playback position, the operation processor 36 uses the decoded content data saved (stored) in the work memory 35. The operation processor 36 identifies a position on the content data, which corresponds to this predetermined playback position, for example, by using the saved content data, thereby acquiring the content data that is to be transmitted to the sink device 20.

In addition, if the user operation is an operation for changing the display mode of content (e.g. full-screen display), the transmitter 33 transmits to the sink device 20 content data for displaying content in the display mode designated by the user operation. If the user operation is an operation for a move to a predetermined URL, the transmitter 33 transmits the data of content of the predetermined URL to the sink device 20. If the user operation is an operation for varying the sound volume of content, the transmitter 33 transmits content data with a varied sound volume to the sink device 20.

In the meantime, when at least a part of content (e.g. an operation screen) is displayed on the screen of the source device 10, the display processor 34 may change the display content in accordance with the process result corresponding to the user operation.

The receiver 41 of the sink device 20 receives the content data based on the process result of the user operation from the source device 10. Then, the content processor 42 and display processor 43 display video on the screen of the sink device 20 by using the received content data. In addition, the content processor 42 and display processor 43 may output audio from the speaker or the like by using the received content data.

When the sink device 20 can process the user operation, the transmitter 44 of the sink device 20 may not transmit the operation data to the source device 10, and may execute the process corresponding to the user operation by the operation processor 45 of the sink device 20. For example, if the user operation is an operation of displaying content in a full-screen mode, the operation processor 45 causes the display processor 43 to display the content in a full-screen mode. If the user operation is an operation for a move to a predetermined URL, the operation processor 45 accesses the predetermined URL and receives the corresponding content data.

In addition, if the user operation is an operation for varying the sound volume of content, the operation processor 45 varies the volume of the speaker or the like provided on the sink device 20.

Next, the case in which a user operation has been executed in the source device 10 is described.

To begin with, when a user operation has been detected, the operation processor 36 of the source device 10 executes a process corresponding to this user operation by using the decoded control stream 32C. Based on the position (coordinates) on the screen at which the user operation has been detected, the operation processor 36 recognizes the operation object (e.g. button 172) operated by the user, for example, from the operation objects on the interactive plane, and executes a process corresponding to the recognized operation object. Then, the transmitter 33 transmits content data corresponding to the process result to the sink device 20. In the meantime, when at least a part of content (e.g. an operation screen) is displayed on the screen of the source device 10, the display processor 34 may change the display in accordance with the process result corresponding to the user operation.

The receiver 41 of the sink device 20 receives from the source device 10 the content data based on the process result of the user operation. Then, the content processor 42 and display processor 43 display video on the screen of the sink device 20 by using the received content data. In addition, the content processor 42 and display processor 43 may output audio from the speaker or the like by using the received content data.

In the meantime, when a user operation has been detected in the source device 10, the transmitter 33 of the source device 10 may transmit the operation data corresponding to the user operation to the sink device 20. The receiver 41 of the sink device 20 receives the operation data, and the operation processor 45 recognizes the user operation detected by the source device 10 by using the received operation data and the decoded control stream 32C, and executes the process corresponding to the recognized user operation.

In this manner, by processing the user operation detected in the source device 10, the user can use the touch panel 17B, which is provided on the source device 10 that is the tablet computer, as a touch pad of the sink device 20.

In the meantime, the transmission by the above-described hybrid-transcoding method may be realized not by the software such as the content transmission program 103B, but by hardware.

Figure 20:
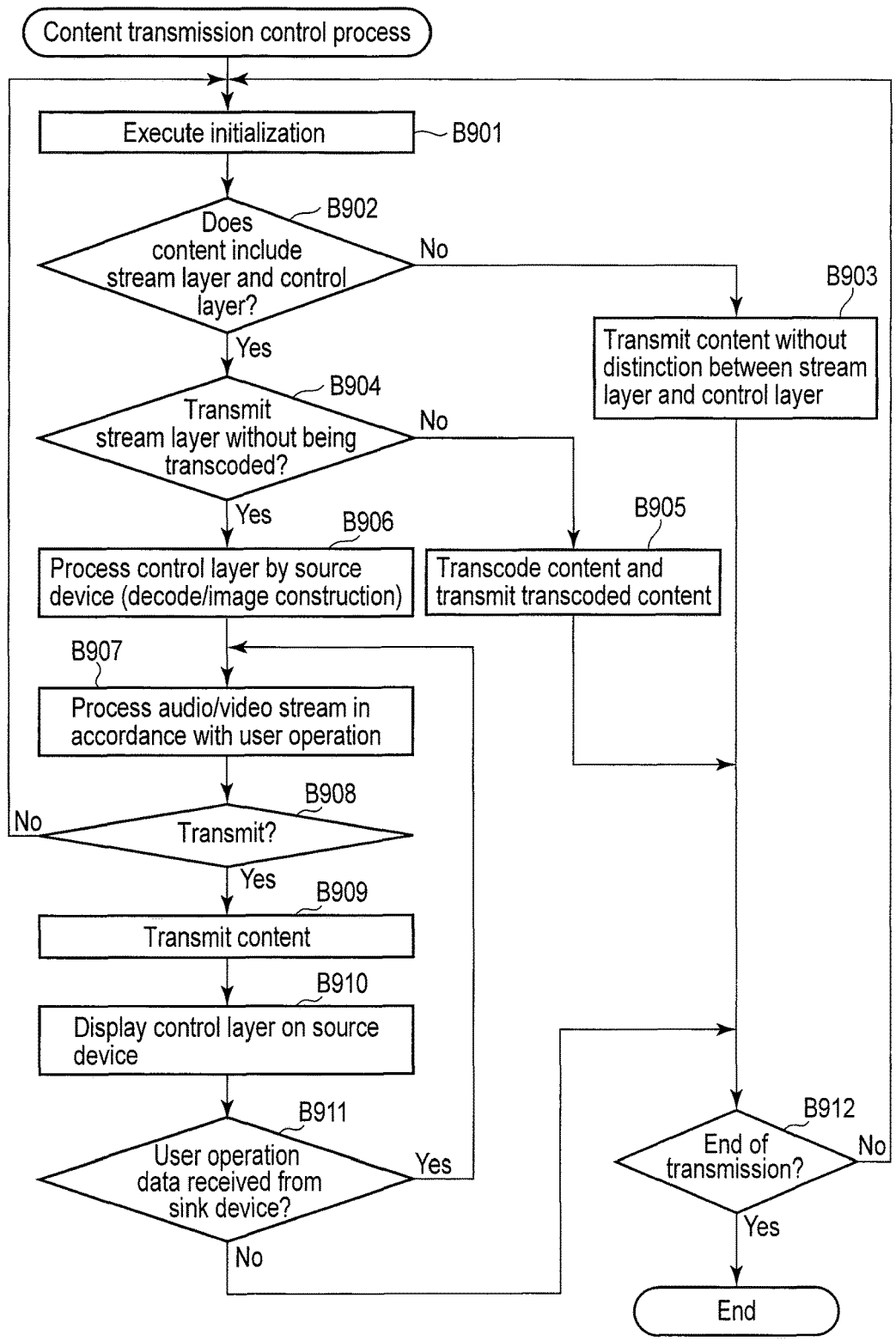
FIG. 20 is a flowchart illustrating an example of the procedure of a content transmission control process executed by the electronic apparatus (source device) of the embodiment.

Next, referring to a flowchart of FIG. 20, a description is given of an example of the procedure of a content transmission control process executed by the source device 10.

The transmitter 33 and receiver 37 execute an initialization process for starting transmission (block B901). The initialization process includes, for example, establishing a connection (wireless connection) between the source device 10 and sink device 20, executing a session for pairing, transmitting/receiving information relating to a user, notifying which transmission method of a transcoding method, a non-transcoding method and a hybrid-transcoding method is used to transmit content data (e.g. transmitting a flag indicative of a transmission method to the sink device 20), and detecting the type of the content by using header information of the content.

The content processor 32 determines whether the content data that is a transmission target includes an AV stream layer and an AV stream control layer (block B902). For example, the content processor 32 determines whether the content data includes not only audio and video, but also information for controlling playback of the audio and video. If the content data does not include both the AV stream layer and the AV stream control layer (No in block B902), the transmitter 33 transmits the content data to the sink device 20 without distinction between the AV stream layer and AV stream control layer (block B903).

If the content data includes the AV stream layer and the AV stream control layer (Yes in block B902), the content processor 32 determines whether to transmit the AV stream layer without transcoding the AV stream layer (block B904). If the AV stream layer is transcoded and transmitted (No in block B904), the transmitter 33 transcodes the content data and transmits the transcoded content data to the sink device 20 (block B905).

If the AV stream layer is transmitted without being transcoded (Yes in block B904), the content processor 32 processes data corresponding to the AV stream control layer in the content data (block B906). For example, the content processor 32 decodes the data corresponding to the AV stream control layer, and executes a process (image construction) for determining a layout of an object and text for a user operation, by using the decoded data. Then, the content processor 32 processes the AV stream of the content in accordance with a user operation (block B907).

Then, the controller 31 determines whether to transmit the content data to the sink device 20 (block B908). If the content data is not transmitted (No in block B908), the process returns to block B901, and the transmitter 33 and receiver 37 execute the initialization process once again.

On the other hand, if the content data is transmitted (Yes in block B908), the transmitter 33 transmits the content data to the sink device 20 (block B909). In addition, the display processor 34 displays, on the screen of the source device 10, an image (e.g. an operation screen) using the AV stream control layer which has been processed in block B906 (block B910).

Next, the operation processor 36 determines whether operation data indicative of a user operation in the sink device 20 has been received from the sink device 20 (block B911). If operation data indicative of a user operation has been received (Yes in block B911), the process returns to block B907, and the content processor 32 processes the audio/video stream in accordance with this user operation (block B907). For example, in accordance with a user operation of controlling playback of content, the content processor 32 acquires content data corresponding to a position of the playback. In addition, for example, in accordance with a user operation of varying a sound volume, the content processor 32 generates an AV stream with a varied volume. Then, when the content data is transmitted (Yes in block B908), the transmitter 33 transmits the content data including the processed AV stream to the sink device 20 (block B909). Besides, the content processor 32 and display processor 34 may change an image corresponding to the AV stream control layer in accordance with the user operation (block B910).

If operation data indicative of a user operation has not been received (No in block B911), the transmitter 33 determines whether to end the transmission of content data (block B912). If the transmission is ended (Yes in block B912), the process is terminated. If the transmission is not ended (No in block B912), the process returns to block B901.

Next, referring to flowcharts of FIGS. 21 to 27, a more concrete description is given of a process in a case where the source device 10 transmits content by a hybrid-transcoding method, and the sink device 20 displays the content. For the purpose of simple description, the case is now assumed that a connection (wireless connection) has been established between the source device 10 and sink device 20, and a link between the devices has been established by the execution of a pairing session. In addition, the content that is transmitted includes an AV stream layer and an AV stream control layer.

Figure 21:
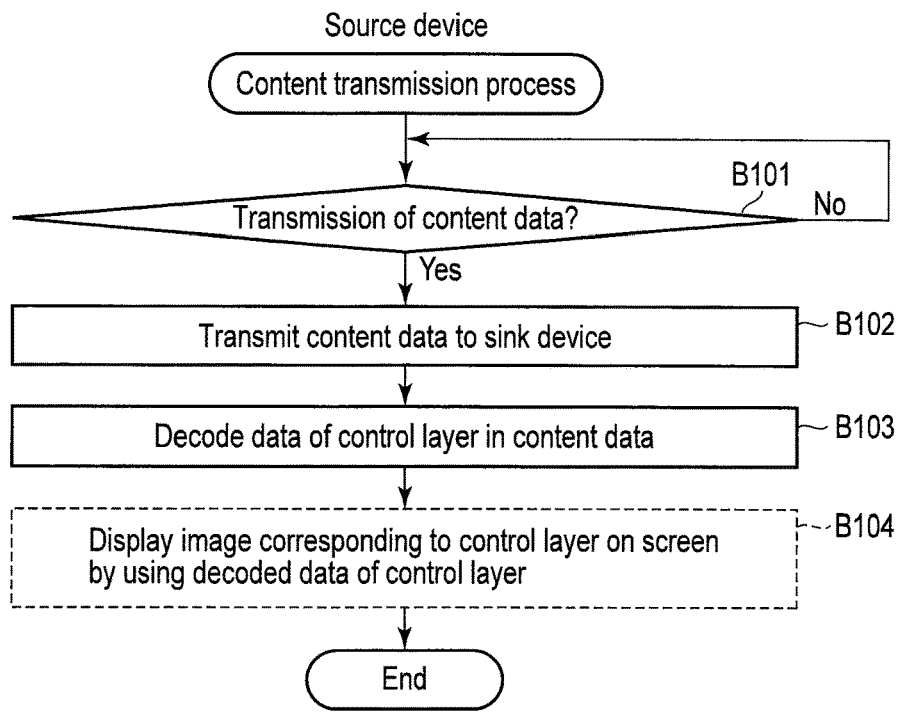
FIG. 21 is a flowchart illustrating a first example of the procedure of a content transmission process executed by the electronic apparatus (source device) of the embodiment.

FIG. 21 illustrates a first example of the procedure of a content transmission process executed by the source device 10.

To start with, the controller 31 determines whether to transmit the content data to the sink device 20 (block B101). For example, when an operation for displaying (outputting) content on the sink device 20 has been detected, the controller 31 determines that the content data is transmitted to the sink device 20. When the content data is not transmitted (No in block B101), the process returns to block B101, and the controller 31 determines once again whether the content data is transmitted to the sink device 20.

When the content data is transmitted (Yes in block B101), the transmitter 33 transmits the content data (original content data) to the sink device 20 (block B102). Then, the content processor 32 decodes the data of the AV stream control layer (control stream) 32C in the content data (block B103). The content processor 32 may temporarily store the decoded data of the interactive plane in the work memory 35. In addition, the display processor 34 may display on the screen of the display 17 an image corresponding to the AV stream control layer by using the decoded data of the AV stream control layer (block B104).

Figure 22:
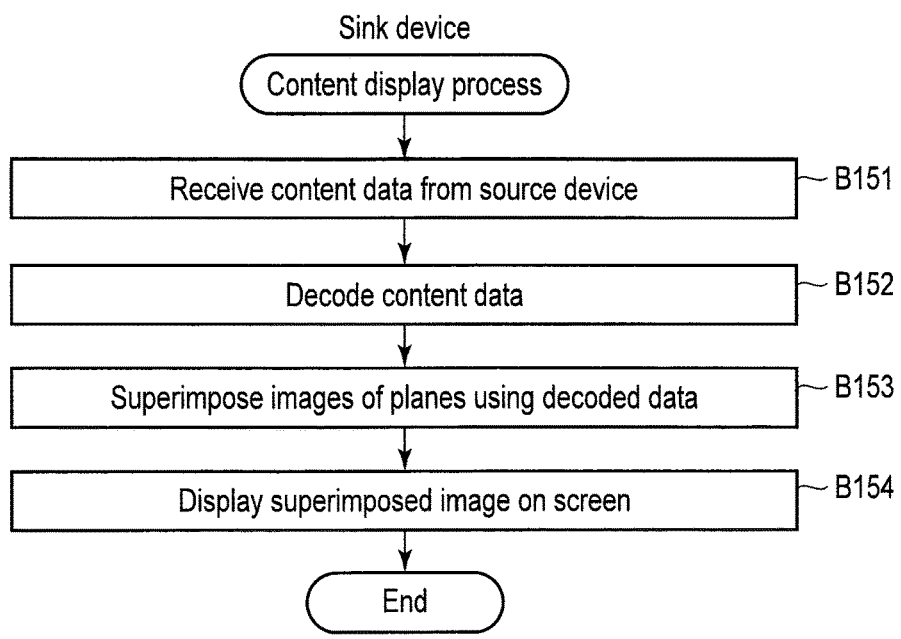
FIG. 22 is a flowchart illustrating a first example of the procedure of a content display process executed by an external electronic apparatus (sink device) which receives content from the electronic apparatus of the embodiment.

FIG. 22 illustrates a first example of the procedure of a content display process executed by the sink device 20. In this content display process, the sink device 20 plays back content by using the content data that has been transmitted from the source device 10 in the process illustrated in FIG. 21.

To start with, the receiver 41 receives the content data (original content data) from the source device 10 (block B151). The content processor 42 decodes the received content data (block B152). The content processor 42 superimposes (overlaps) images of respective planes using the decoded data (block B153). The content processor 42 multiplexes, for example, an image of a main movie plane, an image of a presentation plane and an image of an interactive plane. Then, the display processor 43 displays the superimposed image on the screen (block B154).

Figure 23:
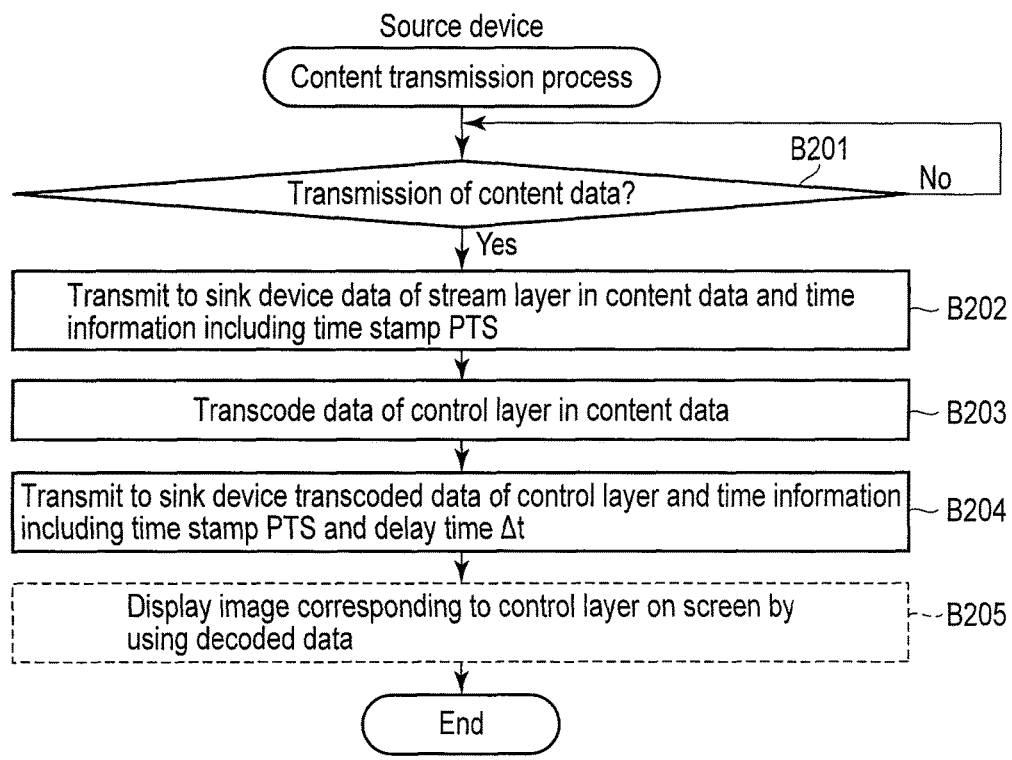
FIG. 23 is a flowchart illustrating a second example of the procedure of the content transmission process executed by the electronic apparatus (source device) of the embodiment.

FIG. 23 illustrates a second example of the procedure of the content transmission process executed by the source device 10.

To start with, the controller 31 determines whether to transmit the content data to the sink device 20 (block B201). When the content data is not transmitted (No in block B201), the process returns to block B201, and the controller 31 determines once again whether the content data is transmitted to the sink device 20.

When the content data is transmitted (Yes in block B201), the transmitter 33 transmits the data of the AV stream layer (AV stream) 32B in the content data and the first time information including the time stamp PTS to the sink device 20 (block B202). Then, the content processor 32 transcodes the data of the AV stream control layer (control stream) 32C in the content data (block B203). The content processor 32 may temporarily store the transcoded data of the AV stream control layer 32C in the work memory 35. The transmitter 33 transmits to the sink device 20 the transcoded data of the AV stream control layer 32C and the second time information including the time stamp PTS and delay time Δt (block B204).

The display processor 34 may display on the screen of the display 17 an image (operation screen) corresponding to the AV stream control layer by using the decoded data of the AV stream control layer 32C (block B205).

Figure 24:
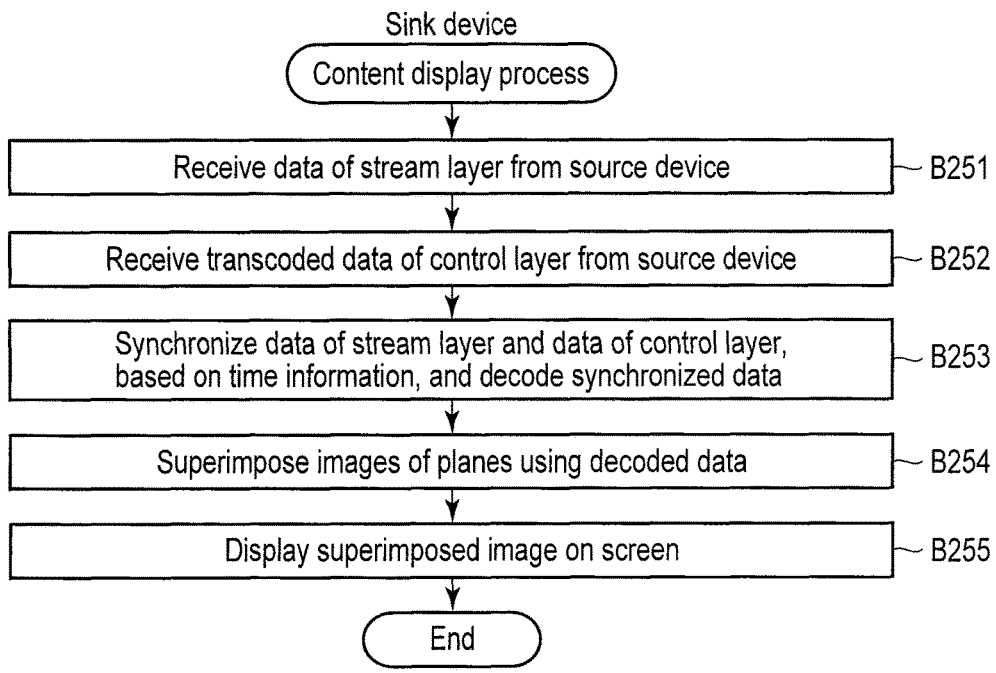
FIG. 24 is a flowchart illustrating a second example of the procedure of the content display process executed by the external electronic apparatus (sink device) which receives content from the electronic apparatus of the embodiment.

FIG. 24 illustrates a second example of the procedure of the content display process executed by the sink device 20. In this content display process, the sink device 20 plays back content by using the content data that has been transmitted from the source device 10 in the process illustrated in FIG. 23.

To start with, the receiver 41 receives from the source device 10 the data of the AV stream layer (AV stream) 32B (block B251) and the transcoded data of the AV stream control layer (control stream) 32C (block B252). Based on the first time information added to the data of the AV stream layer 32B and the second time information added to the transcoded data of the AV stream control layer 32C, the content processor 42 synchronizes the data 32B and the transcoded data 32C and decodes the synchronized data 32B and 32C (block B253). The content processor 42 synchronizes the data of the AV stream layer 32B with the data of the AV stream control layer 32C, for example, by delaying the data 32B by the delay time Δt by using the buffer.

Then, the content processor 42 superimposes (overlaps) images of respective planes using the decoded data (block B254). The content processor 42 multiplexes, for example, an image of a main movie plane using the decoded data of the AV stream layer 32B and an image of an interactive plane using the decoded data of the AV stream control layer 32C. The content processor 42 may superimpose the image of the interactive plane on the image of the main movie plane, or may set the image of the interactive plane to be an embedded image by Picture-in Picture. Incidentally, the presentation plane may be treated as either the main movie plane or the interactive plane. Then, the display processor 43 displays the superimposed image on the screen (block B255).

Figure 25:
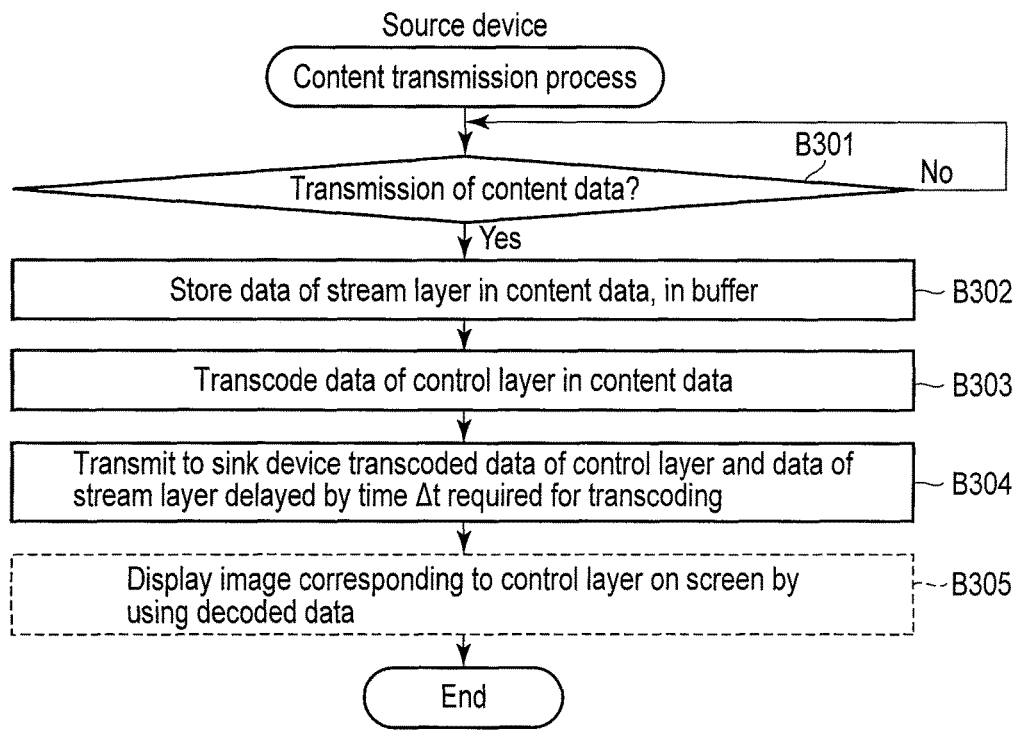
FIG. 25 is a flowchart illustrating a third example of the procedure of the content transmission process executed by the electronic apparatus (source device) of the embodiment.

FIG. 25 illustrates a third example of the procedure of the content transmission process executed by the source device 10.

To start with, the controller 31 determines whether to transmit the content data to the sink device 20 (block B301). When the content data is not transmitted (No in block B301), the process returns to block B301, and the controller 31 determines once again whether the content data is transmitted to the sink device 20.

When the content data is transmitted (Yes in block B301), the content processor 32 stores in the buffer 325 the data of the AV stream layer (AV stream) 32B in the content data (block B302). In addition, the content processor 32 transcodes the data of the AV stream control layer (control stream) 32C in the content data (block B303). Then, the transmitter 33 transmits to the sink device 20 the transcoded data of the AV stream control layer 32C and the data of the AV stream layer 32B which has been delayed by the buffer 325 by the time Δt which was required for the transcoding of the data of the AV stream control layer 32C (block B304).

The display processor 34 may display on the screen of the display 17 an image corresponding to the AV stream control layer by using the decoded data of the AV stream control layer 32C (block B305).

Figure 26:
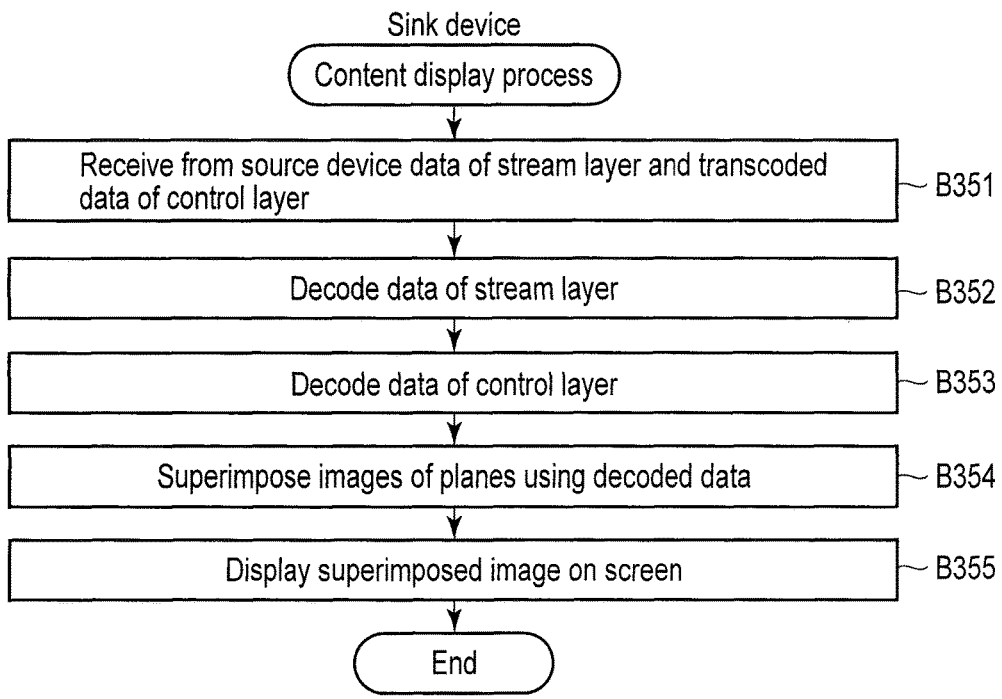
FIG. 26 is a flowchart illustrating a third example of the procedure of the content display process executed by the external electronic apparatus (sink device) which receives content from the electronic apparatus of the embodiment.

FIG. 26 illustrates a third example of the procedure of the content display process executed by the sink device 20. In this content display process, the sink device 20 plays back content by using the content data that has been transmitted from the source device 10 in the process illustrated in FIG. 25.

To start with, the receiver 41 receives from the source device 10 the data of the AV stream layer (AV stream) 32B and the transcoded data of the AV stream control layer (control stream) 32C (block B351). The content processor 42 decodes the data of the AV stream layer 32B (block B352) and decodes the transcoded data of the AV stream control layer 32C (block B353). The content processor 42 superimposes (overlaps) images of respective planes using the decoded data (block B354). The content processor 42 multiplexes, for example, an image of a main movie plane using the decoded data of the AV stream layer and an image of an interactive plane using the decoded data of the AV stream control layer. Incidentally, the presentation plane may be treated as either the main movie plane or the interactive plane. Then, the display processor 43 displays the superimposed image on the screen (block B355).

FIG. 27 illustrates a fourth example of the procedure of the content transmission process executed by the source device 10.

To start with, the controller 31 determines whether to transmit the content data to the sink device 20 (block B401). When the content data is not transmitted (No in block B401), the process returns to block B401, and the controller 31 determines once again whether the content data is transmitted to the sink device 20.

When the content data is transmitted (Yes in block B401), the transmitter 33 transmits the content data (original content data) to the sink device 20 (block B402). Then, the content processor 32 decodes the content data (block B403). The content processor 32 may temporarily store the decoded content data in the work memory 35. The content processor 32 superimposes (overlaps) images of respective planes using the decoded data (block B404). The content processor 32 multiplexes, for example, an image of a main movie plane, an image of a presentation plane, and an image of an interactive plane. Then, the display processor 34 displays the superimposed image on the screen (block B405).

In the meantime, the content display process by the sink device 20, which uses the content data (original content data) transmitted from the source device 20 in the process of FIG. 27, is the same as described with reference to FIG. 22.

Next, referring to flowcharts of FIGS. 28 to 30, processes corresponding to user operations on content will be described.

Figure 28:
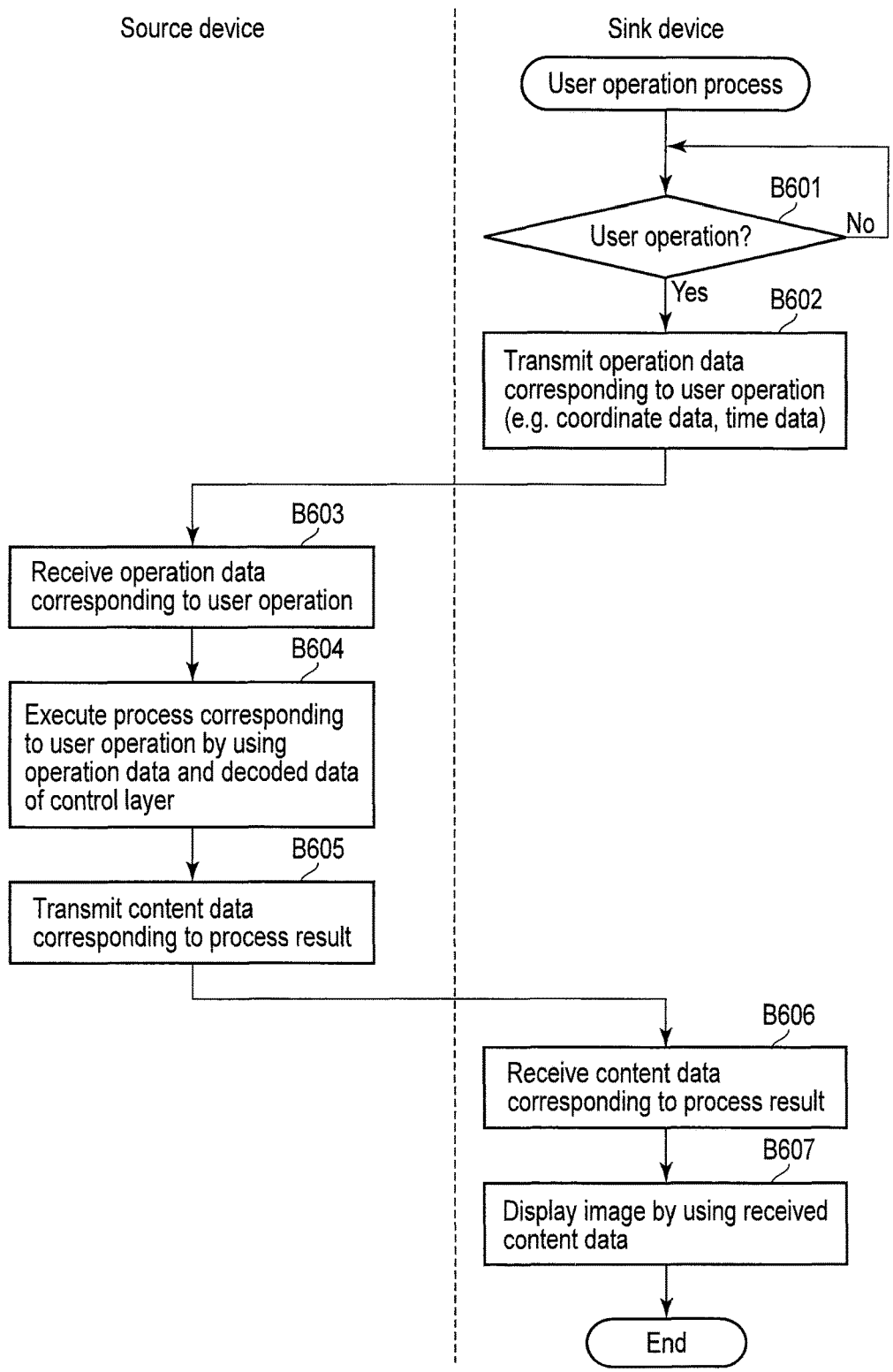
FIG. 28 is a flowchart illustrating a first example of the procedure of a user operation process executed by the electronic apparatus (source device) of the embodiment and the external electronic apparatus (sink device).

FIG. 28 illustrates a first example of the procedure of a user operation process executed by the source device 10 and the sink device 20.

To start with, the operation processor 45 of the sink device 20 determines whether a user operation on content has been detected (block B601). When a user operation has not been detected (No in block B601), the process returns to block B601 and the operation processor 45 determines once again whether a user operation on content has been detected. On the other hand, when a user operation has been detected (Yes in block B601), the transmitter 44 transmits operation data (e.g. coordinate data, time data) corresponding to the user operation to the source device 10 (block B602).

Next, the receiver 37 of the source device 10 receives the operation data corresponding to the user operation from the sink device 20 (block B603). By using the operation data and the decoded data of the AV stream control layer (control stream) 32C, the operation processor 36 recognizes the user operation detected by the sink device 20, and executes a process corresponding to the recognized user operation (block B604). Then, the transmitter 33 transmits the content data corresponding to the process result to the sink device 20 (block B605). In the meantime, when at least a part of the content is being displayed on the screen of the source device 10, the display processor 34 may change the display in accordance with the process result corresponding to the user operation.

The receiver 41 of the sink device 20 receives the content data corresponding to the process result of the user operation from the source device 10 (block B606). Then, the content processor 42 and display processor 43 display an image on the screen by using the received content data (block B607).

Figure 29:
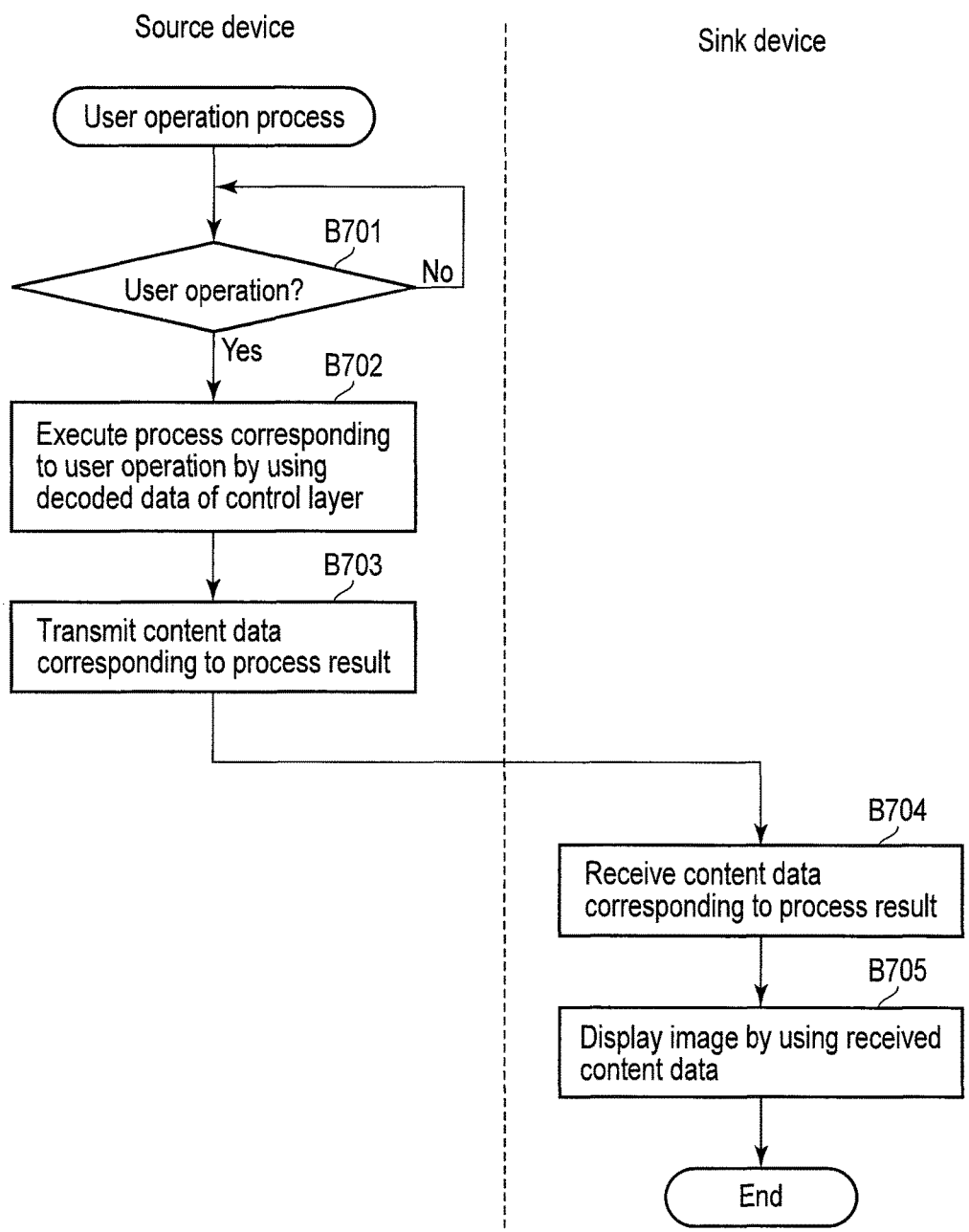
FIG. 29 is a flowchart illustrating a second example of the procedure of the user operation process executed by the electronic apparatus (source device) of the embodiment and the external electronic apparatus (sink device).

FIG. 29 illustrates a second example of the procedure of the user operation process executed by the source device 10 and the sink device 20.

To start with, the operation processor 36 of the source device 10 determines whether a user operation on content has been detected (block B701). When a user operation has not been detected (No in block B701), the process returns to block B701 and the operation processor 36 determines once again whether a user operation on content has been detected. On the other hand, if a user operation has been detected (Yes in block B701), the operation processor 36 and content processor 32 execute a process corresponding to the user operation, by using the decoded data of the AV stream control layer (control stream) 32C (block B702). Then, the transmitter 33 transmits the content data corresponding to the process result to the sink device 20 (block B703). In the meantime, when at least a part of the content is being displayed on the screen of the source device 10, the display processor 34 may change the display in accordance with the process result corresponding to the user operation.

The receiver 41 of the sink device 20 receives the content data corresponding to the process result of the user operation from the source device 10 (block B704). The content processor 42 and display processor 43 display an image on the screen by using the received content data (block B705).

Figure 30:
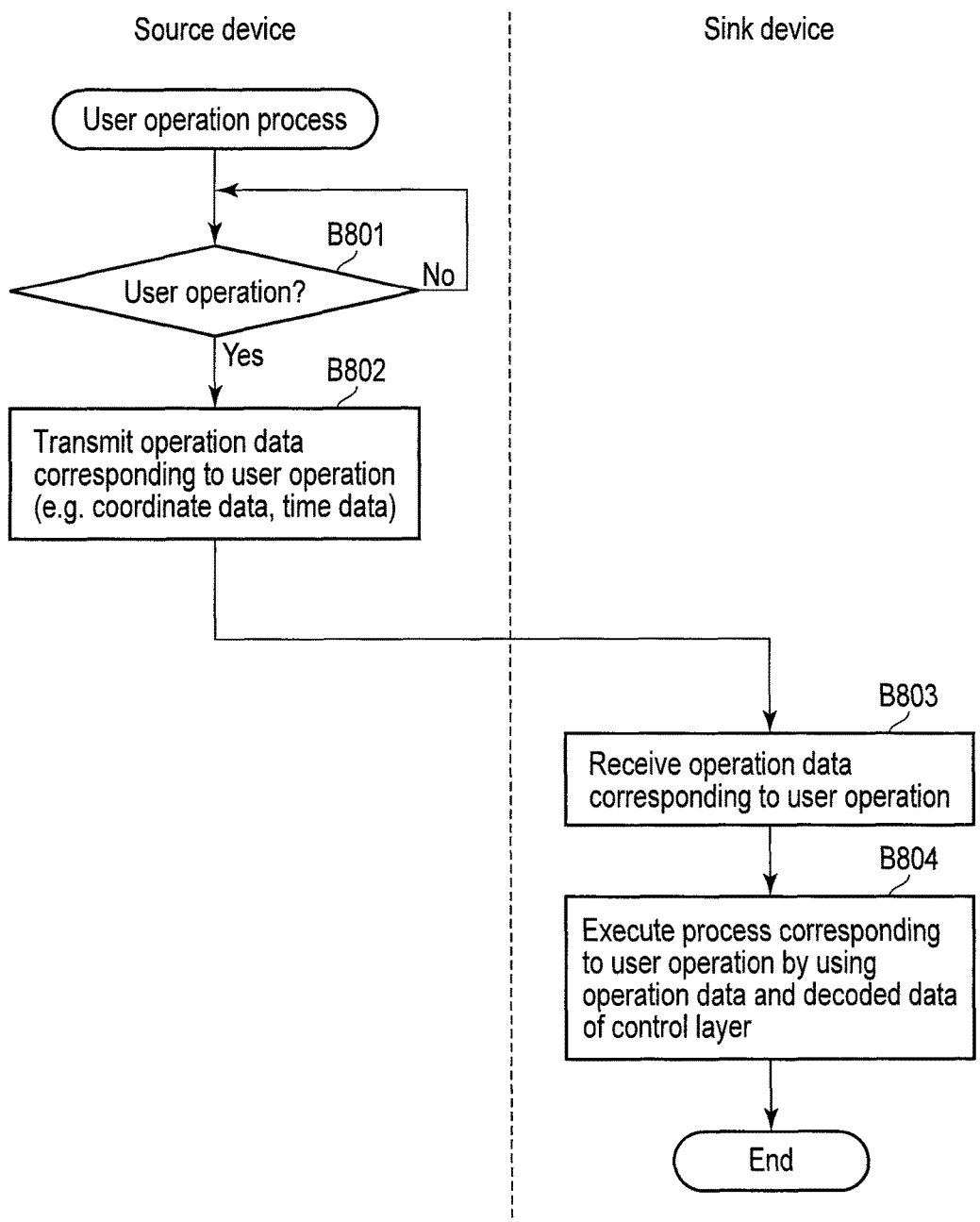
FIG. 30 is a flowchart illustrating a third example of the procedure of the user operation process executed by the electronic apparatus (source device) of the embodiment and the external electronic apparatus (sink device).

FIG. 30 illustrates a third example of the procedure of the user operation process executed by the source device 10 and the sink device 20.

To start with, the operation processor 36 of the source device 10 determines whether a user operation on content has been detected or not (block B801). When a user operation has not been detected (No in block B801), the process returns to block B801 and the operation processor 36 determines once again whether a user operation on content has been detected. On the other hand, if a user operation has been detected (Yes in block B801), the transmitter 33 transmits operation data (e.g. coordinate data, time data) corresponding to the user operation to the sink device 20 (block B802).

Next, the receiver 41 of the sink device 20 receives the operation data corresponding to the user operation from the source device 10 (block B803). Using the received operation data and the decoded data of the AV stream control layer (control stream) 32C, the operation processor 45, content processor 42 and display processor 43 recognize the user operation detected by the source device 10, and execute a process corresponding to the recognized user operation (block B804).

As has been described above, according to the present embodiment, when content is seamlessly displayed between devices, an operation on the content can properly be processed. The content processor 32 of the source device 10 decodes a control stream 32C in an encoded content data which includes an audio/video stream 32B and the control stream 32C for controlling the audio/video stream 32B. The transmitter 33 transmits to the sink device (external electronic apparatus) 20 the audio/video stream 32B, to which the first time information is added, and the control stream 32C, to which the second time information is added. While the video using the audio/video stream (the data of the AV stream layer) 32B and the control stream (the data of the AV stream control layer) 32C is being displayed on the screen of the sink device 20, the operation processor 36 executes, in response to a user operation in the sink device 20, a process corresponding to this user operation by using the control stream 32C which has been decoded by the content processor 32.

Thereby, even in the case of the method in which original content data, which is not transcoded, is transmitted to the sink device 10, the control stream 32C is decoded in the source device 10, and thus the user operation can be recognized by the source device 10 and the operation, which is reflected the user operation, can be realized.

All the process procedures of the embodiment, which have been described with reference to the flowcharts of FIGS. 20 to 30, can be executed by software. Thus, the same advantageous effects as with the present embodiment can easily be obtained simply by installing a computer program, which executes the process procedures, into an ordinary computer through a computer-readable storage medium which stores the computer program, and by executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a memory;
processing circuitry configured to:
   decode a first encoded control stream in content data to generate a first decoded control stream without decoding a first encoded audio/video stream in the content data, and store the first decoded control stream in the memory, wherein the stored first decoded control stream is used for determining an encoded audio/video stream and an encoded control stream to be transmitted to an external electronic apparatus; and
a transmitter configured to transmit the first encoded audio/video stream with a first time information and the first encoded control stream with a second time information to the external electronic apparatus, wherein the first time information and the second time information are to be used to synchronize the first encoded audio/video stream and the first encoded control stream in the external electronic apparatus,
wherein the processing circuitry is further configured to determine, by using the stored first decoded control stream, a second encoded audio/video stream and a second encoded control stream to be transmitted to the external electronic apparatus in accordance with a first user operation on a user interface displayed on the external electronic apparatus and generated by using the transmitted first encoded control stream in the external electronic apparatus.

2. The electronic apparatus of claim 1, wherein the first decoded control stream comprises data for identifying a data position on the first encoded audio/video stream, the data position corresponding to a playback position of the content at a time when the playback position of the content is changed in response to the first user operation.

3. The electronic apparatus of claim 1, wherein each of the first time information and the second time information comprises a time stamp corresponding to the first encoded audio/video stream.

4. The electronic apparatus of claim 1, wherein the processing circuitry is further configured to re-encode the first decoded control stream to generate a re-encoded control stream,
wherein the transmitter is further configured to transmit the first encoded audio/video stream with the first time information and the re-encoded control stream with the second time information to the external electronic apparatus,
the first time information comprises a time stamp corresponding to the first encoded audio/video stream, and
the second time information comprises the time stamp and a time required for decoding the first encoded control stream and re-encoding the first decoded control stream.

5. The electronic apparatus of claim 1, wherein the processing circuitry is further configured to re-encode the first decoded control stream to generate a re-encoded control stream,
wherein the transmitter is further configured to transmit to the external electronic apparatus the first encoded audio/video stream which has been delayed by a time required for decoding the first encoded control stream and re-encoding the first decoded control stream, and the re-encoded control stream.

6. The electronic apparatus of claim 1, wherein the first encoded control stream comprises subtitle information, and
the second time information comprises a time stamp added to the subtitle information.

7. The electronic apparatus of claim 1, wherein the transmitter is further configured to notify, before transmitting the first encoded audio/video stream and the first encoded control stream to the external electronic apparatus, the external electronic apparatus that which transmission method of a transcoding method, a non-transcoding method and a hybrid-transcoding method is used to transmit the first encoded audio/video stream and the first encoded control stream.

8. The electronic apparatus of claim 1, wherein the content data is content data stored in a Blu-ray disc.

9. The electronic apparatus of claim 1, wherein the processing circuitry is further configured to:
display a user interface generated by using the first decoded control stream on a screen of the electronic apparatus without displaying video generated by using the first encoded audio/video stream on the screen; and
determine, if a second user operation on the displayed user interface is performed in the electronic apparatus, a third encoded audio/video stream and a third encoded control stream to be transmitted to the external electronic apparatus.

10. The electronic apparatus of claim 1, further comprising a receiver configured to receive operation data indicative of the first user operation in the external electronic apparatus,
wherein the processing circuitry is further configured to determine the second encoded audio/video stream and the second encoded control stream to be transmitted to the external electronic apparatus in accordance with the first user operation by using the operation data and the stored first decoded control stream.

11. The electronic apparatus of claim 10, wherein the operation data comprises a time stamp of the first encoded audio/video stream, the time stamp corresponding to video displayed on a screen of the external electronic apparatus at a time when the first user operation is performed.

12. The electronic apparatus of claim 1, wherein
the processing circuitry is further configured to decode the second encoded control stream to generate a second decoded control stream without decoding the second audio/video stream, and store the second decoded control stream in the memory, wherein the stored second decoded control stream is used for determining an encoded audio/video stream and an encoded control stream to be transmitted to the external electronic apparatus, and
the transmitter is further configured to transmit the second encoded audio/video stream and the second encoded control stream to the external electronic apparatus.

13. A communication control method comprising:
decoding a first encoded control stream in content data to generate a first decoded control stream without decoding a first encoded audio/video stream in the content data, and storing the first decoded control stream in a memory, wherein the stored decoded control stream is used for determining an encoded audio/video stream and an encoded control stream to be transmitted to an external apparatus;
transmitting the first encoded audio/video stream with a first time information and the first encoded control stream with a second time information to the external electronic apparatus, wherein the first time information and the second time information are to be used to synchronize the first encoded audio/video stream and the first encoded control stream in the external electronic apparatus; and
determining, by using the stored first decoded control stream, a second encoded audio/video stream and a second encoded control stream to be transmitted to the external electronic apparatus in accordance with a user operation on a user interface displayed on the external electronic apparatus and generated by using the transmitted first encoded control stream in the external electronic apparatus.

14. The communication control method of claim 13, wherein the first decoded control stream comprises data for identifying a data position on the first encoded audio/video stream, the data position corresponding to a playback position of content at a time when the playback position of the content is changed in response to the user operation.

15. The communication control method of claim 13, wherein each of the first time information and the second time information comprises a time stamp corresponding to the first encoded audio/video stream.

16. The communication control method of claim 13, wherein the first encoded control stream comprises subtitle information, and the second time information comprises a time stamp added to the subtitle information.

17. A computer-readable, non-transitory storage medium having stored thereon a program which is executable by a computer, the program controlling the computer to execute functions of:

decoding a first encoded control stream in content data to generate a first decoded control stream without decoding a first encoded audio/video stream in the content data, and storing the first decoded control stream in a memory, wherein the stored decoded control stream is used for determining an encoded audio/video stream and an encoded control stream to be transmitted to an external electronic apparatus;

transmitting the first encoded audio/video stream with a first time information and the first encoded control stream with a second time information to the external electronic apparatus, wherein the first time information and the second time information are to be used to synchronize the first encoded audio/video stream and the first encoded control stream in the external electronic apparatus; and determining, by using the stored first decoded control stream, a second encoded audio/video stream and a second encoded control stream to be transmitted to the external electronic apparatus in accordance with a user operation on a user interface displayed on the external electronic apparatus and generated by using the transmitted first encoded control stream in the external electronic apparatus.

18. The computer-readable, non-transitory storage medium of claim 17, wherein the first decoded control stream comprises data for identifying a data position on the first encoded audio/video stream, the data position corresponding to a playback position of content at a time when the playback position of the content is changed in response to the user operation.

19. The computer-readable, non-transitory storage medium of claim 17, wherein each of the first time information and the second time information comprises a time stamp corresponding to the first encoded audio/video stream.

20. The computer-readable, non-transitory storage medium of claim 17, wherein the first encoded control stream comprises subtitle information, and the second time information comprises a time stamp added to the subtitle information.

* * * * *